United States Patent
He et al.

(10) Patent No.: US 12,177,757 B2
(45) Date of Patent: Dec. 24, 2024

(54) METHODS, APPARATUSES, TERMINALS, AND STORAGE MEDIA FOR TRANSMITTING AND RESPONDING TO ASSISTANCE REQUEST

(71) Applicant: TENCENT TECHNOLOGY (SHENZHEN) COMPANY LIMITED, Shenzhen (CN)

(72) Inventors: Fen He, Shenzhen (CN); Sihua Li, Shenzhen (CN); Rong Li, Shenzhen (CN); Wei Xiang, Shenzhen (CN); Hanquan Liu, Shenzhen (CN); Feng Lin, Shenzhen (CN); Qinghua Zhong, Shenzhen (CN); Liqiang Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 337 days.

(21) Appl. No.: 17/717,021

(22) Filed: Apr. 8, 2022

(65) Prior Publication Data
US 2022/0240073 A1    Jul. 28, 2022

Related U.S. Application Data

(63) Continuation of application No. PCT/CN2021/080125, filed on Mar. 11, 2021.

(30) Foreign Application Priority Data

Apr. 22, 2020    (CN) .......................... 202010324287.9

(51) Int. Cl.
*H04W 4/90*    (2018.01)
*H04L 51/046*    (2022.01)
(Continued)

(52) U.S. Cl.
CPC ............. *H04W 4/90* (2018.02); *H04L 51/046* (2013.01); *H04W 4/029* (2018.02)

(58) Field of Classification Search
CPC ..... H04W 52/02; H04W 72/04; H04W 72/12; H04W 74/08; H04W 76/04; H04W 76/28; H04W 4/90; H04W 4/029; H04L 51/046
See application file for complete search history.

(56) References Cited

U.S. PATENT DOCUMENTS

| 2013/0282494 | A1 | 10/2013 | Newlands et al. |
| 2020/0100084 | A1* | 3/2020 | Martin .................... H04W 4/90 |

(Continued)

FOREIGN PATENT DOCUMENTS

| CN | 103037311 A | 4/2013 |
| CN | 104135569 A | 11/2014 |

(Continued)

OTHER PUBLICATIONS

The World Intellectual Property Organization (WIPO) International Search Report for PCT/CN2021/080125 May 25, 2021 5 Pages (including translation).

(Continued)

*Primary Examiner* — Khawar Iqbal
(74) *Attorney, Agent, or Firm* — ANOVA LAW GROUP PLLC

(57) ABSTRACT

Embodiments of this application disclose methods, apparatuses, and storage media for transmitting and responding to assistance request information. The method includes receiving an assistance request instruction; transmitting an assistance request message to an instant messaging client of at least one request-receiving user based on the assistance request instruction, the assistance request message being displayed on a session page of the instant messaging client, the session page being used by the at least one request- (Continued)

receiving user to conduct a message session; and acquiring assistance request content of an assistance requesting user in real time and displaying the assistance request content to the session page.

20 Claims, 17 Drawing Sheets

(51) Int. Cl.
*H04W 4/02* (2018.01)
*H04W 4/029* (2018.01)

(56) References Cited

U.S. PATENT DOCUMENTS

| | | | | |
|---|---|---|---|---|
| 2020/0143651 | A1* | 5/2020 | Beyer | G08B 27/001 |
| 2020/0389335 | A1* | 12/2020 | Kane | H04W 4/021 |
| 2022/0108595 | A1* | 4/2022 | Jiang | G08B 29/186 |
| 2022/0359064 | A1* | 11/2022 | Pierson | G08B 25/005 |
| 2023/0063013 | A1* | 3/2023 | Barash | H04M 1/72418 |
| 2023/0066525 | A1* | 3/2023 | Cabanas | H04W 4/029 |
| 2023/0370540 | A1* | 11/2023 | Martin | H04W 4/02 |
| 2024/0073669 | A1* | 2/2024 | King-Berkman | H04W 4/02 |
| 2024/0098685 | A1* | 3/2024 | Anand | H04W 4/40 |

FOREIGN PATENT DOCUMENTS

| | | |
|---|---|---|
| CN | 106302813 A | 1/2017 |
| CN | 106331334 A | 1/2017 |
| CN | 106408899 A | 2/2017 |
| CN | 107659922 A | 2/2018 |
| CN | 107748924 A | 3/2018 |
| CN | 107862841 A | 3/2018 |
| CN | 107889057 A | 4/2018 |
| CN | 108667711 A | 10/2018 |

OTHER PUBLICATIONS

The State Intellectual Property Office of the People's Republic of China (SIPO) Office Action 1 for 202010324287.9 Oct. 11, 2023 16 Pages (including translation).

* cited by examiner

Chat

○ a     23:13
I saw that video too

○ b     21:4
Email has been sent to you

○ xx group     18:30
Please pay attention to the xx activity

○ yy sharing group     22:56
Really?

Chat    Contact    Mine

①

Please say the voice assistance request signal "123"

Voice input control

Cancel

②

The assistance request request message is sent, and recording
The real-time recording has been sent to the emergency contact you set

○ ▮▮▮▮ 0:58 ▮▮▮▮

I have been rescued

METHODS, APPARATUSES, TERMINALS, AND STORAGE MEDIA FOR TRANSMITTING AND RESPONDING TO ASSISTANCE REQUEST

RELATED APPLICATIONS

This application is a continuation application of PCT Application No. PCT/CN2021/080125, filed on Mar. 11, 2021, which claims priority to Chinese Patent Application No. 202010324287.9 filed on Apr. 22, 2020. The two applications are both incorporated herein by reference in their entirety.

FIELD OF THE TECHNOLOGY

This application relates to the field of communication technologies, and in particular, to methods, apparatuses, terminals, and storage media for transmitting and responding to assistance request information.

BACKGROUND OF THE DISCLOSURE

In recent years, people have paid more and more attention to personal safety issues, and many terminal devices are equipped with emergency help functions. In the related art, users use terminals to ask for help in the form of calls or text messages. The form of emergency request is limited, and the rescue effectiveness is often impaired.

SUMMARY

In view of this, embodiments of this application provide methods, apparatuses, terminals, and storage media for transmitting and responding to assistance request information, which can improve the rescue effect.

One aspect of this application provides a method for transmitting assistance request information, applicable to a terminal for transmitting assistance request information. The method includes receiving an assistance request instruction; transmitting an assistance request message to an instant messaging client of at least one request-receiving user based on the assistance request instruction, the assistance request message being displayed on a session page of the instant messaging client, the session page being used by the at least one request-receiving user to conduct a message session; and acquiring assistance request content of an assistance requesting user in real time and simultaneously displaying the assistance request content to the session page.

Another aspect of this application further provides a method for responding to assistance request information, applicable to a terminal for receiving assistance request information. The method includes receiving an assistance request message from an assistance requesting user; displaying a session page in response to an operation of a request-receiving user for the assistance request message, the session page being used for at least one request-receiving user to conduct a message session; displaying the assistance request message on the session page; and displaying, when assistance request content of the assistance requesting user acquired in real time is received, the assistance request content on the session page.

Another aspect of this application further provides a terminal for transmitting assistance request information, including: one or more processors; and a storage medium, configured to store one or more programs, the one or more programs, when executed by the one or more processors, cause the one or more processors to perform: receiving an assistance request instruction; transmitting an assistance request message to an instant messaging client of at least one request-receiving user based on the assistance request instruction, the assistance request message being displayed on a session page of the instant messaging client, the session page being used by the at least one request-receiving user to conduct a message session; and acquiring assistance request content of an assistance requesting user in real time and simultaneously displaying the assistance request content to the session page.

An embodiment of this application further provides a non-transitory computer-readable storage medium, storing a computer program, the computer program being configured to perform the method for transmitting assistance request information provided in the embodiments of this application when being run.

An embodiment of this application further provides a non-transitory computer-readable storage medium, storing a computer program, the computer program being configured to perform the method for responding to assistance request information provided in the embodiments of this application when being run.

According to the embodiments of this application, the terminal for transmitting assistance request information receives a assistance request instruction, and transmits a assistance request message to an instant messaging client of at least one request-receiving user based on the assistance request instruction, the assistance request message being displayed on a session page of the instant messaging client, the session page being used for the at least one request-receiving user to conduct a message session; and acquires assistance request content of a assistance requesting user in real time, and synchronizes the assistance request content to the session page. Accordingly, the assistance request message is transmitted through the instant messaging client, which enriches the form of assistance request. At least one request-receiving user can conduct a message session through the session page based on the assistance request message. The session page can synchronously display the assistance request content acquired in real time and transmitted by the terminal of the assistance requesting user, so that the request-receiving user can find rescue measures based on the assistance request content, which improves the assistance request success rate. Based on the popularization of the instant messaging client and the advantages of communication forms, the interaction of assistance request information is more convenient, and the request-receiving user can better understand the situation of the assistance requesting user, thereby improving the rescue effect.

BRIEF DESCRIPTION OF THE DRAWINGS

FIG. 5B is a schematic diagram of a page of a process in which an assistance requesting user initiates assistance request according to an embodiment of this application.

DESCRIPTION OF EMBODIMENTS

The technical solutions of embodiments of the present disclosure are clearly and completely described below with reference to the accompanying drawings in the embodiments of the present disclosure. Apparently, the described embodiments are merely a part rather than all of the embodiments of the present disclosure. All other embodiments obtained by a person skilled in the art based on the embodiments of the present disclosure without creative efforts shall fall within the protection scope of the present disclosure.

An embodiment of the present disclosure provides methods, apparatuses, and storage media for transmitting and responding to assistance request information. The assistance request information refers to information related to assistance request, including information such as an assistance request message, location information, and assistance request content in the following embodiments.

Figure 1:
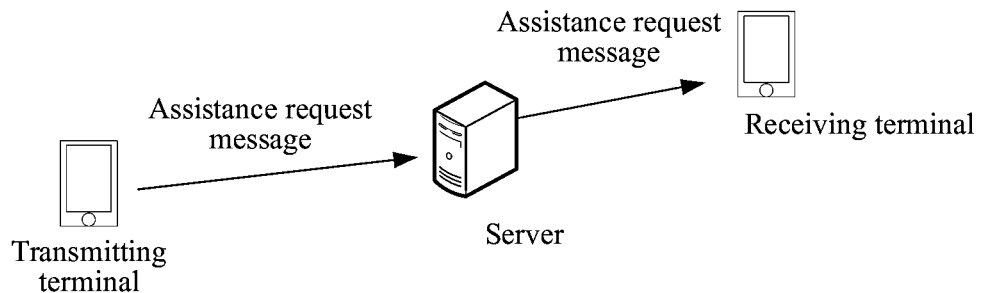
FIG. 1 is a schematic diagram of a scenario of transmitting and responding to assistance request information according to an embodiment of this application.

Referring to FIG. 1, an embodiment of the present disclosure provides an assistance request information interaction system, including: a transmitting apparatus disposed in a terminal for transmitting assistance request information, an assistance request information interaction apparatus disposed in a server, and a receiving apparatus disposed in a terminal for receiving assistance request information.

The terminal for transmitting assistance request information and the terminal for receiving assistance request information may be terminal devices such as mobile phones, tablet computers, and notebook computers, or may be intelligent terminals including wearable devices, smart speakers, smart boxes, and smart TVs. The server may be a backend server of a message system. The server may be a single server, or a server cluster including a plurality of servers.

In this embodiment of this application, the assistance request information interaction system is implemented based on an instant messaging system. The terminal for transmitting assistance request information and the terminal for receiving assistance request information are provided with instant messaging clients. The clients may be clients of instant messaging applications, or may be browser clients. The server is a backend server of the instant messaging system. The method of the present disclosure is described below by taking an example in which the terminal for transmitting assistance request information, the terminal for receiving assistance request information, and the server are in the same system.

The server is configured to implement the information interaction between the terminal for receiving assistance request information and the terminal for transmitting assistance request information, generate an assistance request message according to location information of an assistance requesting user, and transmit the assistance request message to one or more terminals for receiving assistance request information.

The terminal for transmitting assistance request information is configured to initiate assistance request, and may receive an assistance request instruction; the terminal for transmitting assistance request information is configured to transmit an assistance request message to an instant messaging client of at least one request-receiving user based on the assistance request instruction, the assistance request message being displayed on a session page of the instant messaging client, the session page being used for the at least one request-receiving user to conduct a message session; and the terminal for transmitting assistance request information is further configured to acquire assistance request content of an assistance requesting user in real time, and synchronize the assistance request content to the session page.

In some embodiments, the terminal for transmitting assistance request information may transmit an assistance request information transmission request to the server of the system. The request carries information such as voice information and location information of the assistance requesting user. The server may generate an assistance request message according to the information carried in the request, determine a transmission object (that is, a request-receiving user) of the assistance request message according to information preset by the user, and then transmit the assistance request message to the terminal (that is, the terminal for receiving assistance request information) of the request-receiving user in the system.

The terminal for receiving assistance request information may receive an assistance request message from an assistance requesting user; and display the assistance request message on a user operation page of an instant messaging client.

Detailed descriptions are separately provided below. The sequence of the following embodiments is not intended to limit preference orders of the embodiments.

In an embodiment, a description is made from the perspective of an apparatus for transmitting assistance request information. The apparatus for transmitting assistance request information may be integrated in the terminal for transmitting assistance request information. The terminal described in the following embodiments 101 and 102 refers to the terminal for transmitting assistance request information.

Figure 2A:
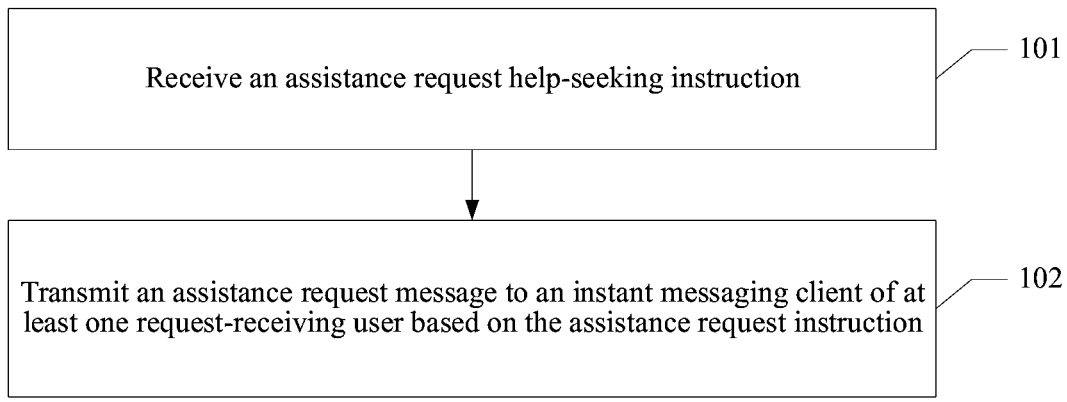
FIG. 2A is a flowchart of a method for transmitting assistance request information according to an embodiment of this application.

As shown in FIG. 2A, a method for transmitting assistance request information is provided, and the method for transmitting assistance request information may be performed by a processor in a terminal. The process may be as follows:

receiving an assistance request instruction.

When a user is in danger and needs to initiate assistance request, the user may perform some operations to trigger a nassistance request instruction. The terminal receives the assistance request instruction and executes the assistance request instruction, so that an instant messaging client transmits an assistance request message.

The instant messaging client includes an instant messaging application installed on the terminal, and may further include a browser client that is accessing the instant messaging application, where the instant messaging application is software for online chatting and communication based on an instant messaging technology.

When the operation of the user is a preset assistance request operation, the assistance request instruction can be triggered.

There may be a variety of preset assistance request operations for triggering the assistance request instruction, and two main manners of triggering the assistance request instruction according to the assistance request operation are described in detail below:

A. When the user triggers the assistance request instruction for the operation of the terminal, the terminal may receive the assistance request instruction. The assistance request operation of the user for the terminal can directly trigger the assistance request instruction, and the assistance request instruction is executed, so that the instant messaging client transmits the assistance request message to an instant messaging client of a request-receiving user. This assistance request manner has fewer steps and simple operations, which can quickly initiate assistance request in critical situations.

The assistance request operation of the user for the terminal not only includes the operation on the user operation page displayed on the terminal, but also includes an operation of the user on the terminal, for example, an assistance request operation such as swaying the mobile phone with a specific frequency and pressing a button on the terminal in a specific manner.

The assistance request operation on the user operation page displayed on the terminal may further include a variety of forms, for example, performing an operation on the user operation page in a preset assistance request operation gesture, or clicking an assistance request control on the user operation page. The operation gesture may include writing "S" on the user operation page, continuously tapping the user operation page for three times, and the like. The assistance request control is an instruction interface, which may be represented as buttons, icons and other forms.

In an embodiment, the user operation page of the instant messaging client may be displayed based on the operation of the assistance requesting user for the terminal, and the assistance request instruction may be triggered simultaneously.

When the operation of the user on the instant messaging client triggers the assistance request instruction, the terminal may receive the assistance request instruction and execute the assistance request instruction, so that the instant messaging client transmits the assistance request message to the instant messaging client of the request-receiving user.

In an embodiment, the assistance requesting user may perform an operation on the user operation page of the instant messaging client, and when the operation is a preset assistance request operation, the assistance request instruction is triggered. The assistance request operation on the user operation page of the instant messaging client may further include a variety of forms, for example, performing an operation on the user operation page in a preset assistance request operation gesture, or clicking an assistance request control on the user operation page.

In an embodiment, triggering the assistance request instruction may include the following steps:

displaying an emergency assistance request page on an instant messaging client of the assistance requesting user;

obtaining assistance request verification information inputted by the assistance requesting user based on an information input operation of the assistance requesting user on the emergency assistance request page; and triggering the reception of the assistance request instruction when verification of the assistance request verification information succeeds.

The emergency assistance request page is a page displayed by the instant messaging client for the user to operate to initiate assistance request. The emergency assistance request page is shown as ② and ③ in FIG. 5B.

In an embodiment, referring to ① and ② in FIG. 5B, the emergency assistance request page may be triggered to display based on a pull-down operation of the user in the instant messaging client.

In an embodiment, when a pull-down operation is detected, the terminal for transmitting assistance request information may transmit a data obtaining request to the server, and render an emergency assistance request page according to data returned by the server.

In some embodiments, to prevent false triggering of the assistance request instruction as much as possible, the assistance requesting user needs to input assistance request verification information, and the assistance request instruction is triggered only when the assistance request verification succeeds. The assistance request verification information is information used for verifying whether assistance request really needs to be initiated in the current situation. If the assistance request verification succeeds, it indicates that the assistance requesting user confirms that the assistance requesting user is in an emergency and needs to initiate assistance request.

The assistance request verification information may be represented in many forms. For example, the assistance request verification information may be represented as a piece of voice inputted by the user, or text inputted by the user, and certainly, may be further represented in various forms such as fingerprints, patterns, and operation gestures.

In an embodiment, the assistance requesting user may input assistance request verification information on the emergency assistance request page. Corresponding to the form of the assistance request verification information, the emergency assistance request page includes different input controls. For example, the emergency assistance request page may include a voice input control and/or a text editing control and/or a fingerprint input control and/or a connection pattern input control, and the like.

The controls in the emergency assistance request page are instruction interfaces for a user operation to input the assistance request verification information. Different controls may be represented in different forms. For example, the voice input control may be represented as a microphone icon, the text editing control may be represented as a text input box, the fingerprint input control may be represented as a fingerprint input region, and the connection pattern input control may be represented as a nine-square grid formed by nodes. The user may touch and hold the microphone icon to enter a piece of voice as the assistance request verification information, or click the text input box to activate a text editing keyboard for editing operations, to enter text as the assistance request verification information, or the user may enter a fingerprint in the fingerprint input region or draw a pattern by connecting nodes in the nine-square grid as the assistance request verification information.

To facilitate the user to understand the steps for initiating assistance request and make the user learn an operation that needs to be performed at the current moment, prompt information may be displayed on the emergency assistance request page, for example, "please say the assistance request signal '123'" may be displayed as the prompt information.

In an embodiment, when it is identified that the assistance request verification information is a preset assistance request signal, it is considered that the assistance request verification information passes the verification. The identification action may be performed in the terminal or in the server. For example, after obtaining the assistance request verification information inputted by the assistance requesting user, the terminal may obtain the account of the assistance requesting user in the instant messaging system, obtain the assistance request information preset by the user from the server based on the account, and then identify whether the assistance request verification information is a preset assistance request signal. If the assistance request verification information is the preset assistance request signal, the terminal obtains location information of the assistance requesting user. In another example, after obtaining the assistance request verification information inputted by the user, the terminal transmits the assistance request verification information and the account of the assistance requesting user to the server. The server identifies whether the assistance request verification information is the preset assistance request signal, and returns an identification result to the terminal. When the assistance request verification information is the preset assistance request signal, the terminal obtains the location information of the assistance requesting user.

The assistance request verification information and the assistance request signal may have many different forms. Generally, the assistance request verification information and the assistance request signal are in the same form. For example, if the assistance request signal is in the voice form, the assistance request verification information is also in the voice form. The assistance request verification information and the assistance request signal may be alternatively in different forms. For example, the user may set the assistance request signal in the text form. When initiating assistance request, the user may input voice as the assistance request verification information. The terminal may transmit the voice information to the server for identification, to determine text content corresponding to the voice information, and then identify whether the text content matches the preset assistance request signal. The identification process relates to automatic speech recognition (ASR) of artificial intelligence, which is aimed at converting the vocabulary content of human speech into computer-readable input, such as keystrokes, binary codes, and character sequences. Different from speaker identification and speaker verification, the latter attempts to identify or identify the speaker who uttered the speech rather than the vocabulary content contained.

In some embodiments, before initiating assistance request, the user further needs to preset information such as the assistance request signal, the request-receiving user, and the assistance request permission on the terminal for transmitting assistance request information, which may include the following steps:

displaying an assistance request setting page according to an assistance request setting instruction triggered by the assistance requesting user, the assistance request setting page including an assistance request signal setting control, a request-receiving user setting control, and a assistance request permission setting control;

determining, based on a setting operation of the assistance requesting user for the assistance request signal setting control, an assistance request signal for triggering assistance request;

determining, from associated users of the assistance requesting user in an instant messaging system, an associated rescue user for transmitting the assistance request message based on a setting operation of the assistance requesting user for the request-receiving user setting control; and determining assistance request permission based on a setting operation of the assistance requesting user for the assistance request permission setting control.

In an embodiment, when receiving the assistance request setting instruction triggered by the user, the terminal may obtain data of the assistance request setting page from the server or the local memory, and render the assistance request setting page according to the data. A plurality of different instruction interfaces are set on the assistance request setting page, and are respectively used to set information such as the assistance request signal, the request-receiving user, and the assistance request permission. The assistance request setting page is shown as ② and ③ in FIG. 5B.

The assistance request signal setting control is an instruction interface used to set the assistance request signal, and may be represented in various forms such as a button, a selection box, and an icon. The assistance request signal is a signal preset by the user and used for initiating assistance request. The assistance request signal may be represented in a variety of forms, for example, the assistance request signal may be represented as a piece of voice inputted by the user, or text inputted by the user, and certainly, may be further represented in various forms such as fingerprints, patterns, and operation gestures.

In some embodiments, to facilitate the user to quickly initiate assistance request, when the assistance request signal is represented as voice information, the duration is shorter; and when the assistance request signal is represented as text, the words are fewer and it is easy to edit and input. For example, the assistance request signal may be set as a number "123", and the operation gestures include swipe up, swipe down, touch and hold, double tap, and other forms. The pattern may be represented as a node connection pattern in a nine-square grid (similar to a nine-square grid lock screen pattern of a mobile phone).

Figure 5A:
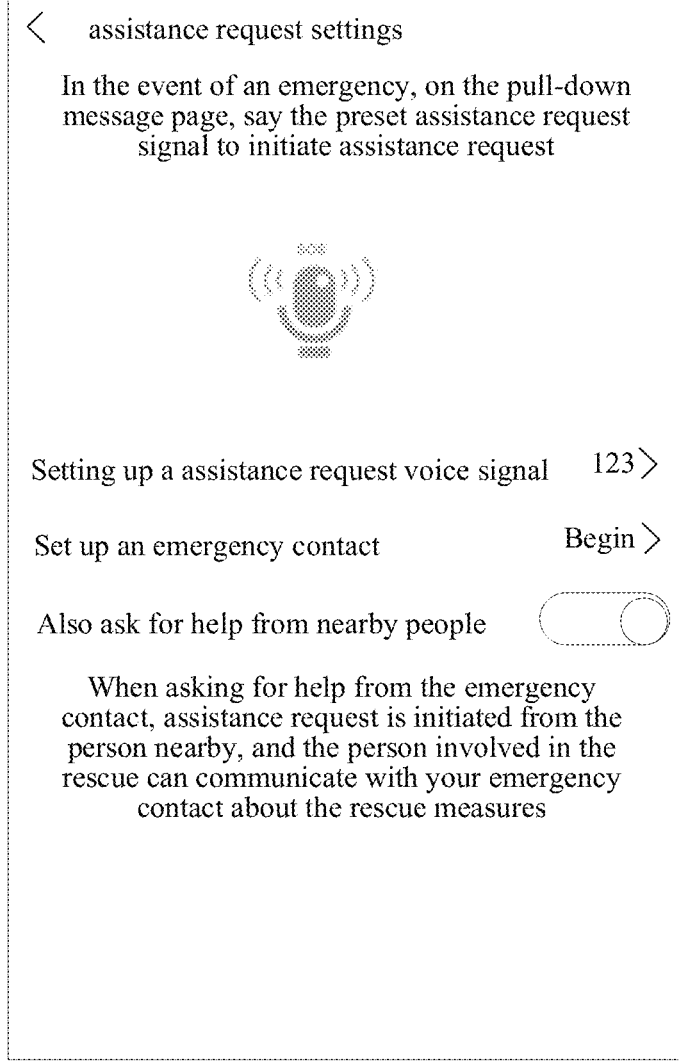
FIG. 5A is a schematic diagram of an assistance request setting page according to an embodiment of this application.

In an embodiment, referring to FIG. 5A, the assistance request signal setting control is represented as a jump button. When the assistance requesting user clicks the jump button, another page is jumped and displayed, and the page is used for inputting the assistance request signal. According to the different expression forms of the assistance request signal, the content contained in the page is also different. For the possible content of the page, refer to the emergency assistance request page used for the assistance request verification information above, and details are not repeated herein.

Both a request-receiving user and a rescue user represent contacts of the assistance requesting user when an emergency occurs. In the embodiments of the present disclosure, the associated user is a user of the instant messaging system. The assistance requesting user may preset an associated user in the instant messaging system as the request-receiving user, where the associated user refers to a user related to the assistance requesting user in the instant messaging system, for example, a user who has a friend relationship with the assistance requesting user.

The request-receiving user setting control is an instruction interface used to set the request-receiving user (that is, an object of assistance request), and may be represented in various forms such as a selection box, a button, and an icon. In an embodiment, referring to FIG. 5A, an object setting control is represented as a jump button. When the assistance requesting user clicks the jump button, another page is jumped and displayed. In some embodiments, the step of "determining, from associated users of the assistance requesting user in an instant messaging system, an associated rescue user for transmitting the assistance request message based on a setting operation of the assistance requesting user for the request-receiving user setting control" may include: transmitting an object obtaining request to the server based on an object viewing operation of the user for the request-receiving user setting control, the object obtaining request carrying an assistance requesting user account; receiving relationship chain data of the assistance requesting user account returned by the server based on the object obtaining request; and displaying a request-receiving user selection page according to the relationship chain data, the request-receiving user selection page including a plurality of selectable associated users, and an associated user account being associated with the assistance requesting user account.

The assistance request permission is permission information used for indicating the scope of assistance request. The user may preset the assistance request permission. Depending on the assistance request permission, the terminal may allow or disallow transmitting assistance request message to a non-associated user.

Setting more associated users as request-receiving users (that is, associated rescue users), or setting the assistance request permission to allow transmitting the assistance request message to non-associated users can expand the scope of rescue and increase the possibility for the assistance requesting user to be successfully rescued.

The assistance request permission setting control is an instruction interface used to set the assistance request permission, and may be represented in various forms such as a selection box, an icon, and a button. In an embodiment, referring to FIG. 5A, the assistance request permission setting control is represented as a sliding button. The assistance requesting user slides the button to set the assistance request permission to allow or disallow transmitting the assistance request message to a non-associated user.

102: Transmit an assistance request message to an instant messaging client of at least one request-receiving user based on the assistance request instruction.

In some embodiments, the assistance request message is displayed on a session page of the instant messaging client, and the session page is used for the at least one request-receiving user to conduct a message session. In other words, after the assistance request message is transmitted to the terminal of the request-receiving user, the terminal of the request-receiving user displays a session page for at least one request-receiving user to conduct a message session, and displays the received assistance request message on the session page. Accordingly, when there are a plurality of (that is, at least two) request-receiving users, the plurality of request-receiving users are brought into the same session (the session may be a temporary session), so that the plurality of request-receiving users may discuss rescue strategies according to the assistance request message on the session page. In some embodiments, the assistance requesting user and the request-receiving user may be in the same session group, that is, after transmitting the assistance request message, the terminal of the assistance requesting user displays the session page including the assistance request message, so that the assistance requesting user and the request-receiving user may conduct a session based on the session page. In an embodiment, the assistance request message may be displayed by using a map thumbnail. Location information corresponding to the assistance requesting user is marked in the map thumbnail. Accordingly, the request-receiving user can quickly position the location of the assistance requesting user.

In an embodiment, after transmitting the assistance request message, the terminal of the assistance requesting user further acquires assistance request content of an assistance requesting user in real time, and synchronize the assistance request content to the session page. For example, voice assistance request content of the user is acquired in real time, that is, the terminal of the assistance requesting user records in real time, and synchronizes recording content as the assistance request content to the foregoing session page displayed by the terminal of the request-receiving user. Correspondingly, when receiving the voice assistance request content, the terminal of the request-receiving user synchronously displays audio playback information corresponding to the voice assistance request content in a voice playback region on the session page, and plays the voice assistance request content, the audio playback information being used for indicating that the voice assistance request content is being played.

In an embodiment, after transmitting the assistance request message, the terminal of the request-receiving user may display a message transmission indication page, and display a transmission result (for example, the assistance request signal is transmitted) of the assistance request message and voice acquisition indication information corresponding to the assistance request content on the indication page, the voice acquisition indication information being used for indicating that audio acquisition is being performed in real time, and indicating that an audio acquisition result is synchronized to the session page.

In an embodiment, the terminal needs to transmit the assistance request message to the request-receiving user according to the assistance request permission set by the assistance requesting user. In some embodiments, the step of "transmitting an assistance request message to an instant messaging client of at least one request-receiving user based on the assistance request instruction" may include: transmitting the assistance request message to an instant messaging client of an associated rescue user when the assistance request permission is that asking for help from a non-associated user is not allowed, the associated rescue user being a request-receiving user associated with the assistance requesting user in an instant messaging system; obtaining a user of the instant messaging system within a preset assistance request distance threshold as a non-associated rescue user when the assistance request permission is that asking for help from a non-associated user is allowed; and transmitting the assistance request message to the instant messaging client of the associated rescue user and an instant messaging client of the non-associated rescue user.

In an embodiment, "obtaining a user of the instant messaging system within a preset assistance request distance threshold as a non-associated rescue user, and transmitting the assistance request message to the non-associated user" may be performed by using the following logic: Assistance request is first performed from users within 1000 m from the assistance requesting user, and if no one responds to the assistance request message, the distance is spread to 2000 m. If still no one responds to the assistance request message, the distance is spread to 4000 m, and so on. The assistance request signal circle is spread with a range of 1000 m each time, up to 10,000 m. If no one responds to the assistance request message within 20,000 m, it is refreshed whether there are new online users within 20,000 m, and the assistance request message is pushed to newly online users in the instant messaging system.

In another embodiment, the user may further preset the assistance request permission to allow directly or disallow transmitting the assistance request message to a local rescue agency. The local rescue agencies are official rescue agencies such as police stations, hospitals, and fire brigade within the jurisdiction of the user.

In an embodiment, the terminal for transmitting assistance request information may transmit the location information of the user to the server based on the assistance request instruction; and the server may generate an assistance request message according to the location information, and transmit the assistance request message.

The assistance request message includes the location information of the assistance requesting user. In an embodiment, a positioning apparatus is disposed in the terminal to obtain the location information of the assistance requesting user in real time, and forward the location information to the server. The server or the terminal may generate an assistance request message according to the real-time location information of the assistance requesting user. The assistance request message includes the location information of the assistance requesting user, requested text information such as "I'm in danger, come and help me", and the like. The assistance request message may be displayed in the form of pictures and/or text, and on different pages, the assistance request message may be displayed in different forms, which is described with reference to the embodiments of 201 and 202. The details are not repeated herein.

In an embodiment, the terminal may further continuously transmit real-time location information to the server. Referring to FIG. 5E, after the step of "transmitting an assistance request message to an instant messaging client of at least one request-receiving user", the following step is further included: displaying a rescue map, the rescue map including at least a real-time location mark of the assistance requesting user or a real-time location mark of the request-receiving user.

Referring to in FIG. 5E, the rescue map is a map for representing a rescue operation process. In an embodiment, in addition to the real-time location mark of the assistance requesting user and the real-time location mark of the request-receiving user, the rescue map may further include a user name of the request-receiving user, and one or more of information such as a distance between the assistance requesting user and the request-receiving user, and an action path. To facilitate distinguishing between the assistance requesting user and the request-receiving user, the real-time location mark of the assistance requesting user and the real-time location mark of the request-receiving user may be set to different colors or different icons.

In some embodiments, if the request-receiving user may refuse to join the rescue by not responding to the assistance request message, the rescue map only displays a real-time location mark of a request-receiving user participating in the rescue (that is, a request-receiving user who responds to the assistance request message), as well as the real-time location mark of the assistance requesting user. Responding to the assistance request message includes two situations: response through an operation of the request-receiving user and automatic response.

In some embodiments, referring to ③ and ④ in FIG. 5E, after the assistance request message is transmitted, the user operation page may be returned from the emergency assistance request page based on an operation of the assistance requesting user. Only information about the assistance request status is displayed at the top of the user operation page.

In an embodiment, the terminal may further acquire assistance request content based on the assistance request instruction, and transmit a message generated by using the assistance request content to the request-receiving user. Therefore, rescuers can quickly understand the situation of the assistance requesting user, and quickly find rescuers and implement rescues. For example, if the assistance requesting user is in danger in the car, even if the request-receiving user learns the geographic location, the request-receiving user cannot quickly find the assistance requesting user. The request-receiving user may learn the exact location of the assistance requesting user according to the assistance request content.

In an embodiment, the acquisition of the assistance request content is triggered when verification of the assistance request verification information succeeds.

The assistance request content is information used for helping the request-receiving user to understand the situation of the assistance requesting user, and may be in the form of audio (including voice), a video, a photo, or the like. When the verification of the assistance request verification information succeeds, it indicates that the assistance requesting user confirms that the assistance requesting user is in an emergency and needs to initiate assistance request. In this case, the assistance request content may be acquired by the terminal. The acquisition of the assistance request content may be initiated by the assistance requesting user, or automatically initiated by the terminal. Correspondingly, before initiating assistance request, the assistance requesting user may set corresponding permission. When the assistance requesting user presets the permission to allow the terminal to automatically initiate the acquisition of the assistance request content, if it is detected that the verification of the assistance request verification information succeeds, the terminal automatically turns on the microphone or camera to acquire information such as audio, photos, or videos of a scene where the assistance requesting user is located as the assistance request content.

In some embodiments, when detecting that the verification of the assistance request verification information succeeds, the terminal automatically enables an audio recording function, uses recorded audio information as the assistance request content, and continuously transmits the assistance request content to the server. The server then forwards the assistance request content to the request-receiving user.

In an embodiment, the terminal may transmit the assistance request message in the form of a single chat session in the instant messaging system, or may transmit the assistance request message in the form of a group chat session, or may transmit the assistance request message in the form of a system message.

In an embodiment, the request-receiving user may refuse to join the target group for rescue by not responding to the assistance request message. The transmission of the assistance request content to instant messaging clients of members in a target group is triggered when an instant messaging client of at least one request-receiving user responds to the assistance request message, the members of the target group including the assistance requesting user and at least one request-receiving user that responds to the assistance request message.

A chat session group is a chat session group in the instant messaging system. The chat session group may be used for real-time chat and communication among a plurality of people. The request-receiving users may communicate in real time and quickly in the target group, to cooperate with each other to achieve better rescue effect.

In some embodiments, the target group may be a temporary chat session group, and the chat session group may be used for real-time chat and communication among a plurality of people. When the assistance requesting user confirms that the assistance request is over, the chat session group may be automatically disbanded.

Figure 5C:
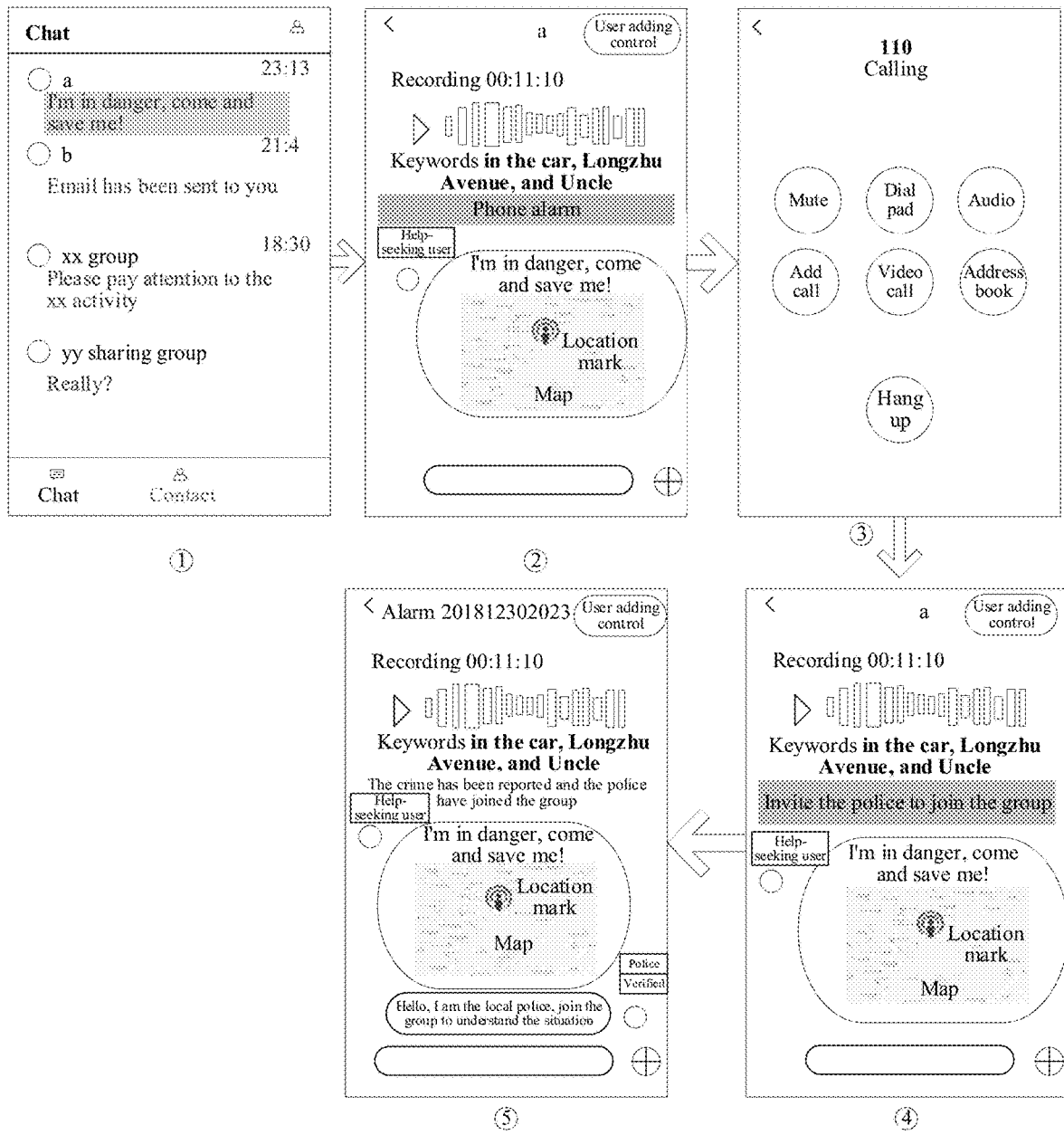
FIG. 5C is a schematic diagram of a page of a process in which an emergency contact responds to assistance request according to an embodiment of this application.

Based on the above, according to actual requirements, the processes of responding to the assistance request message, joining the target group, and transmitting the assistance request message have various situations, including but not limited to the following embodiments and the splits and combinations of the following embodiments:

In an embodiment, referring to FIG. 5C, the assistance requesting user only sets one associated user as the request-receiving user, and the assistance request permission is set to disallow asking for help from a non-associated user. In this case, to prevent no one to help, considering that the assistance requesting user and the request-receiving user are originally friends, the request-receiving user may be set to automatically respond to the assistance request message without the operation of the request-receiving user, and the request-receiving user and the assistance requesting user automatically form a target group. When the assistance requesting user sets a plurality of associated users as request-receiving users and/or allows asking for help from non-associated users, the assistance request message needs to be transmitted first. When a response is obtained, the assistance requesting user and a request-receiving user who responds to the assistance request message are added to a target group, and the assistance request message and/or the assistance request content is transmitted to the target group.

In an embodiment, to enable the associated user (that is, an emergency contact) set by the assistance requesting user to instantly understand the situation of the assistance requesting user and participate in the rescue, an associated user may be set to automatically respond to the assistance request message without the operation of the associated user, to directly add the associated user to the target group, and the assistance request message and/or the assistance request content is transmitted to the target group. Before a non-associated user is added to the target group, the assistance request message needs to be transmitted to the non-associated user first. When the non-associated user responds to the assistance request message, the non-associated user who responds to the assistance request message is also added to the target group.

In an embodiment, associated users may be alternatively set to form a target group and non-associated users are set to form another target group, and communication is conducted in different groups respectively.

In an embodiment, the assistance requesting user may be set to directly transmit the assistance request message to the associated user in the form of a single chat session, and after the associated user responds to the assistance request message, a user who responds to the assistance request message is added to the target group for a group chat session.

In an embodiment, the assistance requesting user may be alternatively set to transmit the assistance request messages to each request-receiving user in the form of an ordinary single chat session, and continue to receive assistance request content in the single chat session.

As can be learned from above, in the embodiments of this application, an assistance request instruction is received; and an assistance request message is transmitted to an instant messaging client of at least one request-receiving user based on the assistance request instruction. In the embodiments of the present disclosure, the assistance request message is transmitted through the instant messaging client. Based on the popularization of the instant messaging client and the advantages of communication forms, the interaction of assistance request information is more convenient, and the request-receiving user can better understand the situation of the assistance requesting user, thereby improving the rescue effect.

A process of responding to assistance request information is described below, where the terms appearing in the embodiments of 201 and 202 have the same meanings as the same terms in the embodiments of 101 and 102, and the details are not repeated in the following embodiments.

In an embodiment, a description is made from the perspective of an apparatus for receiving assistance request information. The apparatus for receiving assistance request information may be integrated in the terminal. The terminal may be a terminal for receiving assistance request information. The terminal described in the following embodiments 201 and 102 refers to the terminal for receiving assistance request information.

Figure 2B:
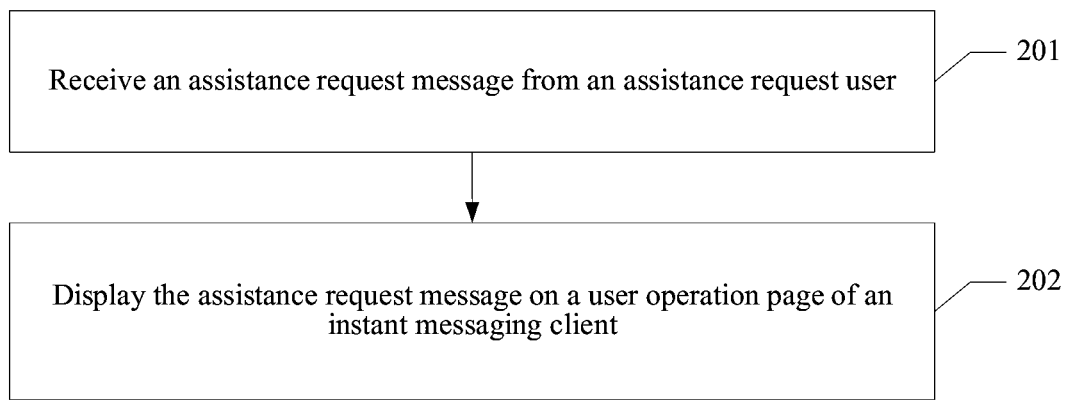
FIG. 2B is a flowchart of a method for responding to assistance request information according to an embodiment of this application.

As shown in FIG. 2B, a method for responding to assistance request information is provided, and the method for responding to assistance request information may be performed by a processor of the terminal for receiving assistance request information. The process may be as follows:

receiving an assistance request message from an assistance requesting user.

The terminal for receiving assistance request information may receive, through the server, the assistance request message transmitted by the assistance requesting user.

The assistance request message includes at least information for expressing assistance request, and the information may be in the form of words, pictures, and the like. For example, the information may be represented as "I'm in danger, come and save me! !", may be represented in the form of an assistance request signal such as "sos", or may be represented in the form of voice, pictures, and the like that express assistance request.

In an embodiment, to facilitate the request-receiving user to implement rescues, the assistance request message may further include location information of the assistance requesting user. The location information of the assistance requesting user may be represented in various forms such as text and maps.

In an embodiment, to facilitate the request-receiving user to clarify the feasibility of implementing the rescue from the perspective of the location of the assistance requesting user, the assistance request message may further include location information of the request-receiving user using the terminal, and may even include location information of another request-receiving user. Further, the assistance request message may further include information such as a distance between the assistance requesting user and each request-receiving user, and a movement route.

In an embodiment, the location information of the assistance requesting user may be displayed in the form of a user identifier in a map. The identifier of the assistance requesting user in the map may change in real time with the movement of the assistance requesting user. A real-time location mark of the request-receiving user may be further displayed in the map. Information such as the distance between the request-receiving user and the assistance requesting user, and the movement path of the assistance requesting user may be even displayed. In addition, to distinguish the assistance requesting user, the request-receiving user corresponding to the current terminal, other request-receiving users who do not respond to the assistance request message, and users who respond to the assistance request message, marks of the users with different identities in the map may be displayed with different colors and icons. For example, referring to ① in FIG. 5F, the assistance requesting user is set to red, the user corresponding to the current terminal is set to blue, other request-receiving users who do not respond to the assistance request message are set to gray, and the users who respond to the assistance request message are set to icons of a superman image.

The assistance request message is displayed on a user operation page of an instant messaging client.

Figure 5D:
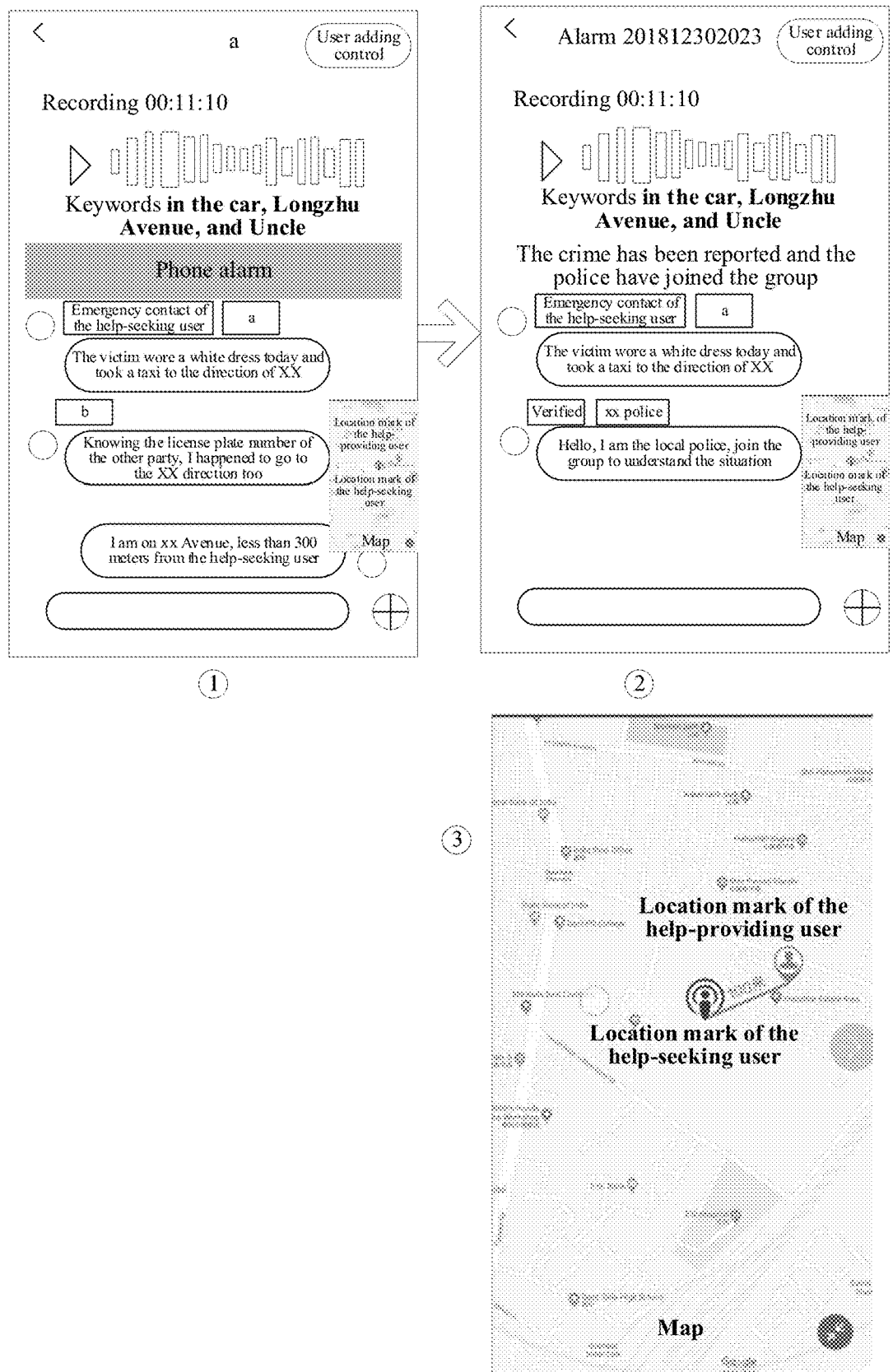
FIG. 5D is a schematic diagram of displaying a rescue map on a session page according to an embodiment of this application.
Figure 5E:
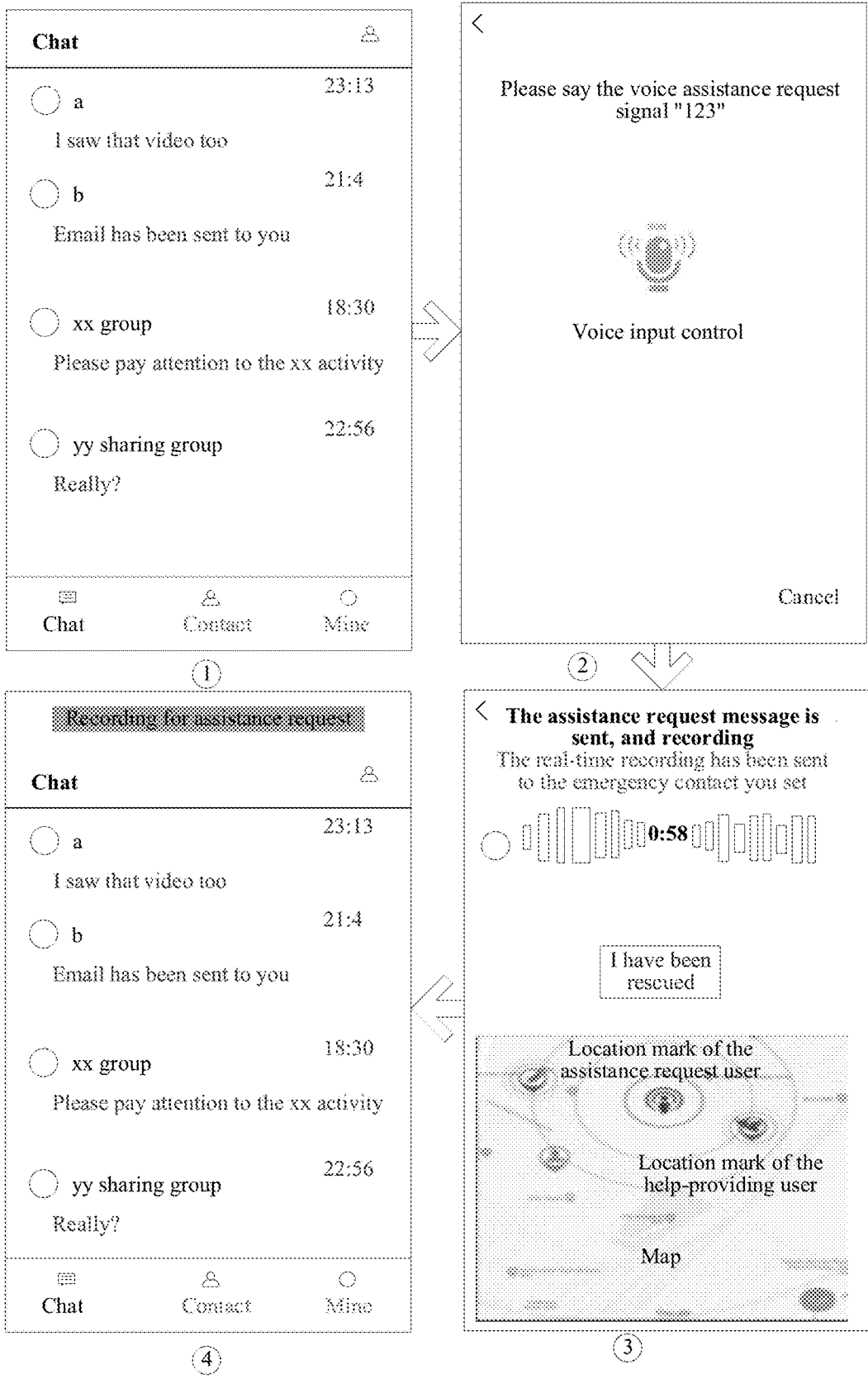
FIG. 5E is a schematic diagram of a process of displaying a rescue map in a terminal of an assistance requesting user according to an embodiment of this application.
Figure 5F:
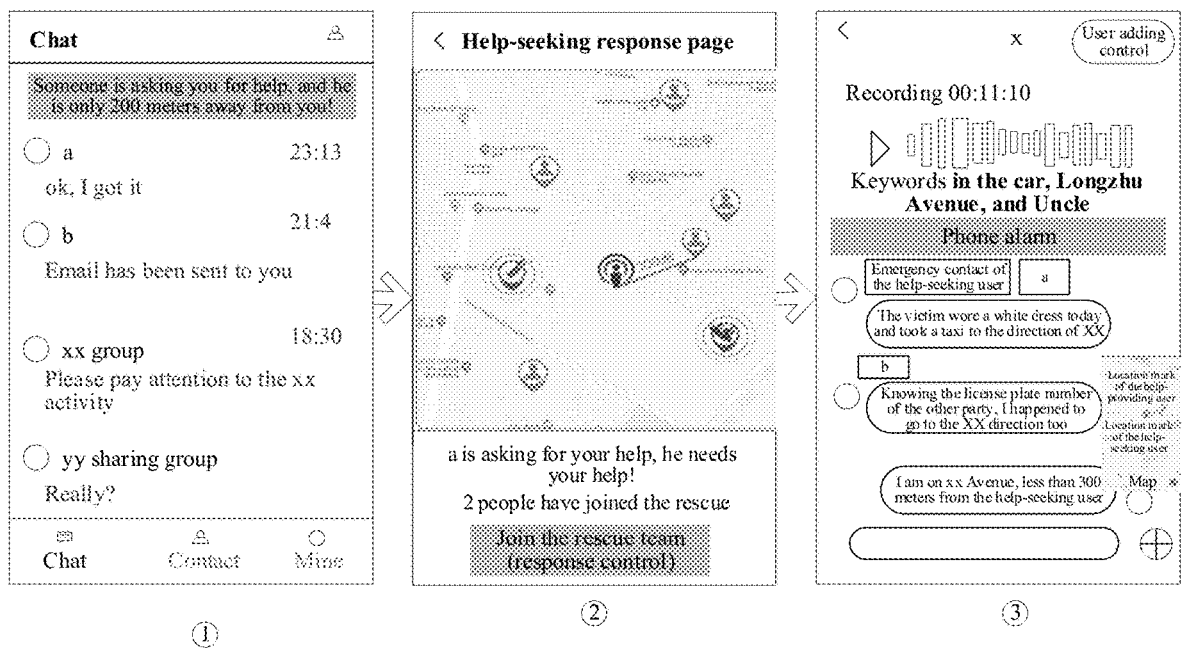
FIG. 5F is a schematic diagram of a page of responding to an assistance request message according to an embodiment of this application.

Referring to ① in FIG. 5F and ① in FIG. 5C, to facilitate the user to detect the assistance request message in time, the assistance request message may be set to a warning color such as red.

The assistance request message has various representations, for example, the assistance request message may be displayed on the page of the instant messaging client in the form of a system message (instead of a chat message between users). In another example, the assistance request message may be transmitted to the instant messaging client of the request-receiving user in the form of a chat message. The different forms of the assistance request message are described below with two embodiments:

In an embodiment, in instant messaging clients of request-receiving users with different identities, the assistance request message is displayed in different forms. For example, referring to ① in FIG. 5C, when the assistance request message is transmitted to an associated rescue user, the assistance request message may be transmitted to the instant messaging client of the request-receiving user in the form of a single chat session message. Referring to ① in FIG. 5F, when the content is transmitted to a non-associated rescue user, the assistance request message may be displayed on the top of the page of the instant messaging client in the form of a system message.

In an embodiment, referring to ② in FIG. 5F, after the assistance request message is displayed in the form of a system message, the request-receiving user may operate the assistance request message, thereby agreeing or refusing to join the rescue. When the request-receiving user agrees to join the rescue, the information interaction may be continued in the form of a chat session, which may include the following steps:

displaying a session page in response to an operation of a request-receiving user for the assistance request message, the session page including the assistance request message.

The assistance request message in the form of a system message may not be completely the same as the assistance request message displayed on the session page. Referring to ① in FIG. 5C and ① in FIG. 5F, to quickly attract the attention of the request-receiving user, when the assistance request message is displayed in the form of a system message, the assistance request message may be represented as a short text or signal indicating assistance request. Referring to ② in FIG. 5C and ③ in FIG. 5F, to facilitate the user to further understand the information of the assistance requesting user, when the assistance request message is displayed in the form of a chat message, in addition to displaying the assistance request text or signal, the location information of the assistance requesting user in the assistance request message may be further displayed, and the location information is displayed in the form of a location mark in the map.

In some embodiments, Referring to FIG. 5F, the step of "displaying a session page in response to an operation of a request-receiving user for the assistance request message" may include: displaying an assistance request response page in response to the operation of the request-receiving user for the assistance request message, the assistance request response page including location information of the assistance requesting user and a response control; and displaying the session page in response to a trigger operation of the request-receiving user for the response control.

On the assistance request response page, the real-time location information of the assistance requesting user may be displayed in the form of a map, and information such as the location information of the request-receiving user, a distance, and a movement route may be further displayed. Reference may be made to the foregoing embodiments, and details are not repeated herein.

The response control is an instruction interface configured for user operations to agree to participate in rescues, and may be represented in various forms such as icons and buttons. For example, referring to ② in FIG. 5F, the response control may be represented as a button. To facilitate the request-receiving user to clarify the function of the response control, prompt information such as "join the rescue team" may be displayed in the button.

In some embodiments, after responding to the assistance request message, the request-receiving user joins the target group and participate in the rescue in the form of a group chat session. In some embodiments, the step of "displaying a session page in response to an operation of a request-receiving user for the assistance request message" may include:

displaying a session page of a target group on an instant messaging client in response to the operation of the request-receiving user for the assistance request message, members of the target group including the assistance requesting user and at least one request-receiving user, and the session page of the target group including the assistance request message.

The target group is a chat session group in the instant messaging client. To protect the information security of users who are not friends in the target group, the group chat session may be set as a temporary session. After the assistance requesting user conforms that the assistance request is over, the group is automatically disbanded.

The assistance request message is transmitted to the target group, so that members in the target group can communicate and cooperate with each other quickly, thereby improving the rescue effect.

In another embodiment, before the request-receiving user operates on the assistance request message, the server may determine a target group according to an account relationship between the assistance requesting user and the request-receiving user, but a session page of the target group is not displayed at this time. The request-receiving user operates on the assistance request message only to trigger the instruction to display the session page. When the terminal detects the operation of the user on the assistance request message, the instruction to display the session page is triggered, and the terminal executes the instruction to display the session page.

In some embodiments, after the assistance request message is responded to, the assistance request content acquired by the assistance requesting user may be further received, and the assistance request content is displayed on the session page.

In some embodiments, referring to ②, ④, and ⑤ in FIG. 5C, ① and ② in FIG. 5D, and ③ in FIG. 5F, to prevent the members of the session from being inconvenient to view the assistance request content transmitted by the assistance requesting user due to the change of messages, the session page may be set to include an assistance request content display region and a response message display region, and the assistance request content transmitted by the assistance requesting user is displayed in the assistance request content display region. When a response message transmitted by the request-receiving user is received, the response message transmitted by the request-receiving user is displayed in the response message display region. The response message and the assistance request content are displayed in different regions, so that the response message does not affect the display of the assistance request content, and the request-receiving user can directly and simply view the assistance request content.

The assistance request content may be represented in the form of audio, a video, a photo, or the like.

In an embodiment, the assistance request content may be represented as voice information inputted by the assistance requesting user. In some embodiments, the step of "displaying the assistance request content on the session page" may include displaying the assistance request content and an assistance request keyword on the session page, the assistance request keyword being a keyword obtained by recognizing the audio information.

The keyword obtained by recognizing the audio information involves ASR and natural language processing (NLP) of artificial intelligence. The recognition process may be performed in the terminal or in the server, and the keyword and the audio information are transmitted to the terminal by the server for display. The keyword is a keyword used to describe the situation of the assistance requesting user, and there are keywords used to describe different types of information such as time, place, person, and request. For example, in FIG. 5C and FIG. 5F, there are keywords such as "in the car, Longzhu Avenue, and Uncle".

The session page may further include many other controls. Different controls are instruction interfaces for implementing different functions, and may be represented in various forms such as icons and buttons.

For example, the session page may include an alarm control, and an alarm call may be initiated based on a trigger operation of the request-receiving user for the alarm control.

When a group chat session is conducted in the form of a target group, a session page of the target group may display not only the alarm control, but also a rescue agency adding control. In an embodiment, the rescue agency adding control and the alarm control may be displayed simultaneously. In another embodiment, after the alarm call is initiated based on the trigger operation of a member of the target group for the alarm control, the rescue agency adding control is displayed on the session page.

A member of the target group may trigger the rescue agency adding control to add a rescue agency to the target group, and the process may include the following steps: triggering obtaining of, when a trigger operation of a member of the target group for the rescue agency adding control is detected, an account of a local rescue agency in an instant messaging system and adding of the account to the target group according to the location information of the assistance requesting user; and displaying, when a response message transmitted by the rescue agency is received, the response message transmitted by the rescue agency on the session page of the target group. The rescue agencies may include police, hospitals, and other agencies that can provide help. In some embodiments, any member of the target group may trigger the addition of a rescue agency. When a trigger operation of the user for the rescue agency adding control is detected, an adding request is transmitted to the server. The server searches for a police account of the jurisdiction corresponding to the assistance requesting user according to the location of the assistance requesting user, and adds the police account to the target group.

In another embodiment, if the assistance request permission set by the user is to allow directly asking help from the local rescue agency, after triggering the assistance request instruction, the assistance requesting user may further directly transmit the assistance request message and the assistance request content to the rescue agency in the form of a single chat session while transmitting the assistance request message to the request-receiving user.

In some embodiments, the session page of the target group may further include a user adding control. A session user selection list is displayed when a trigger operation of a member of the target group for the user adding control is detected, a session user being an associated user of the request-receiving user in the instant messaging system. The addition of a session user selected by the request-receiving user to the target group is triggered based on a selection operation of the request-receiving user in the session user selection list. Accordingly, the request-receiving user may invite friends to join the rescue, thereby enhancing the power of the rescue.

In an embodiment, referring to FIG. 5D, to facilitate the request-receiving user to view the rescue process, a rescue map may be suspended on the session page, the rescue map including a real-time location mark of the assistance requesting user and a real-time location mark of the request-receiving user. In an embodiment, based on the operation of the terminal user, the rescue map may be further movably displayed on the session page.

Figure 5G:
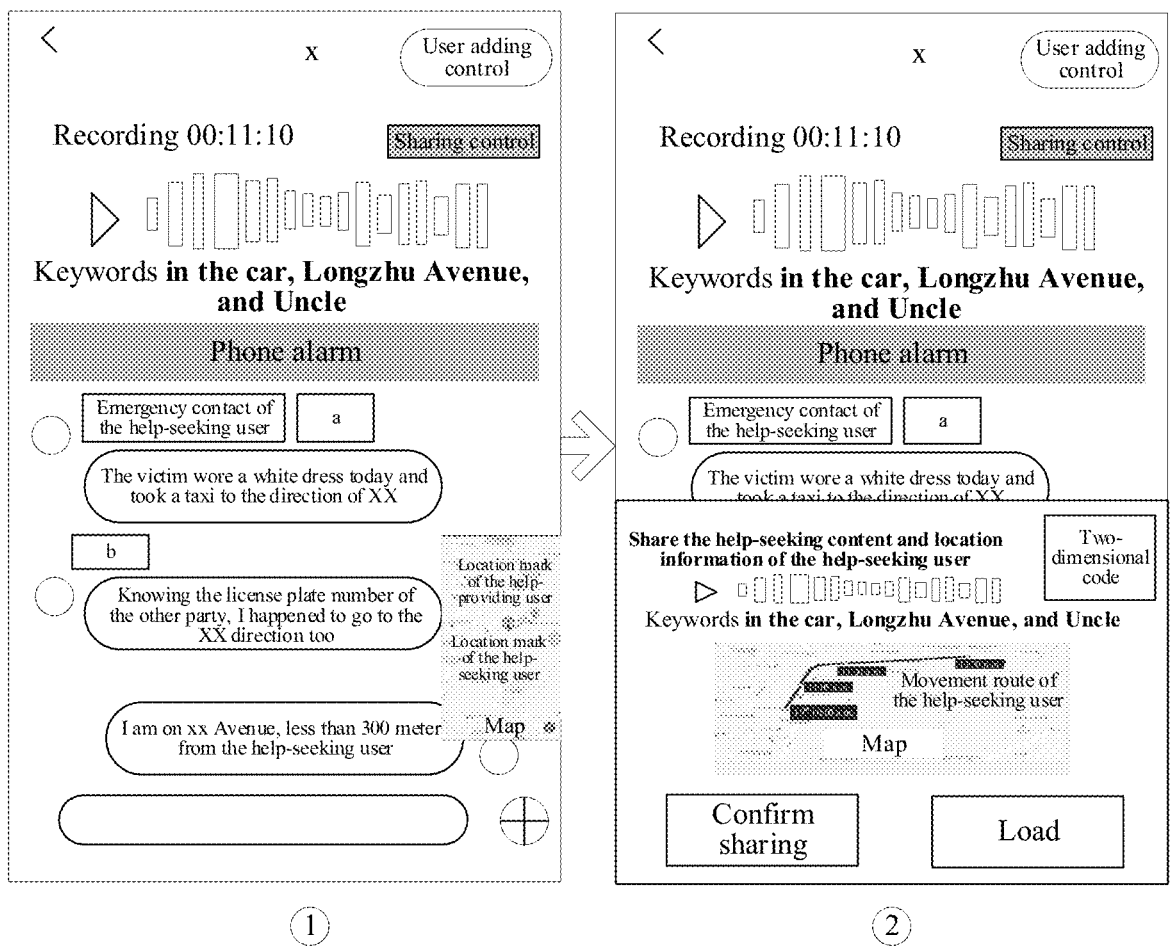
FIG. 5G is a schematic diagram of a page of sharing assistance request information according to an embodiment of this application.

In an embodiment, referring to FIG. 5G, the session page may further include a sharing control, and sharing of the location information of the assistance requesting user and the assistance request content is triggered when a trigger operation of the request-receiving user for the sharing control is detected.

In some embodiments, the step of "triggering sharing of the location information of the assistance requesting user and the assistance request content when a trigger operation of the request-receiving user for the sharing control is detected" may include: generating to-be-shared information according to the location information of the assistance requesting user and the assistance request content when a trigger operation of a member of the target group for the sharing control is detected; displaying a sharing preview page, the sharing preview page including the to-be-shared information and a sharing confirmation control; and sharing the to-be-shared information when a trigger operation of the user for the sharing confirmation control is detected. The user may click the sharing control to transmit the to-be-shared information to a user in the instant messaging system, and the user in the instant messaging system may directly click to play the voice and view the location in the to-be-shared information.

In some embodiments, referring to ② in FIG. 5G, the sharing preview page further includes a download control, and when a trigger operation of the user for the download control is detected, the to-be-shared information is downloaded. The to-be-shared information includes a two-dimensional code. The user may transmit the downloaded to-be-shared information to another communication system. A user in another communication system may scan the two-dimensional code to play voice and view the location.

As can be learned from above, in the embodiments of the present disclosure, the assistance request message is transmitted through the instant messaging client. Based on the popularization of the instant messaging client and the advantages of communication forms, the interaction of assistance request information is more convenient, and the request-receiving user can better understand the situation of the assistance requesting user, thereby improving the rescue effect.

The process of transmitting and responding to assistance request information is described below.

Figure 6A:
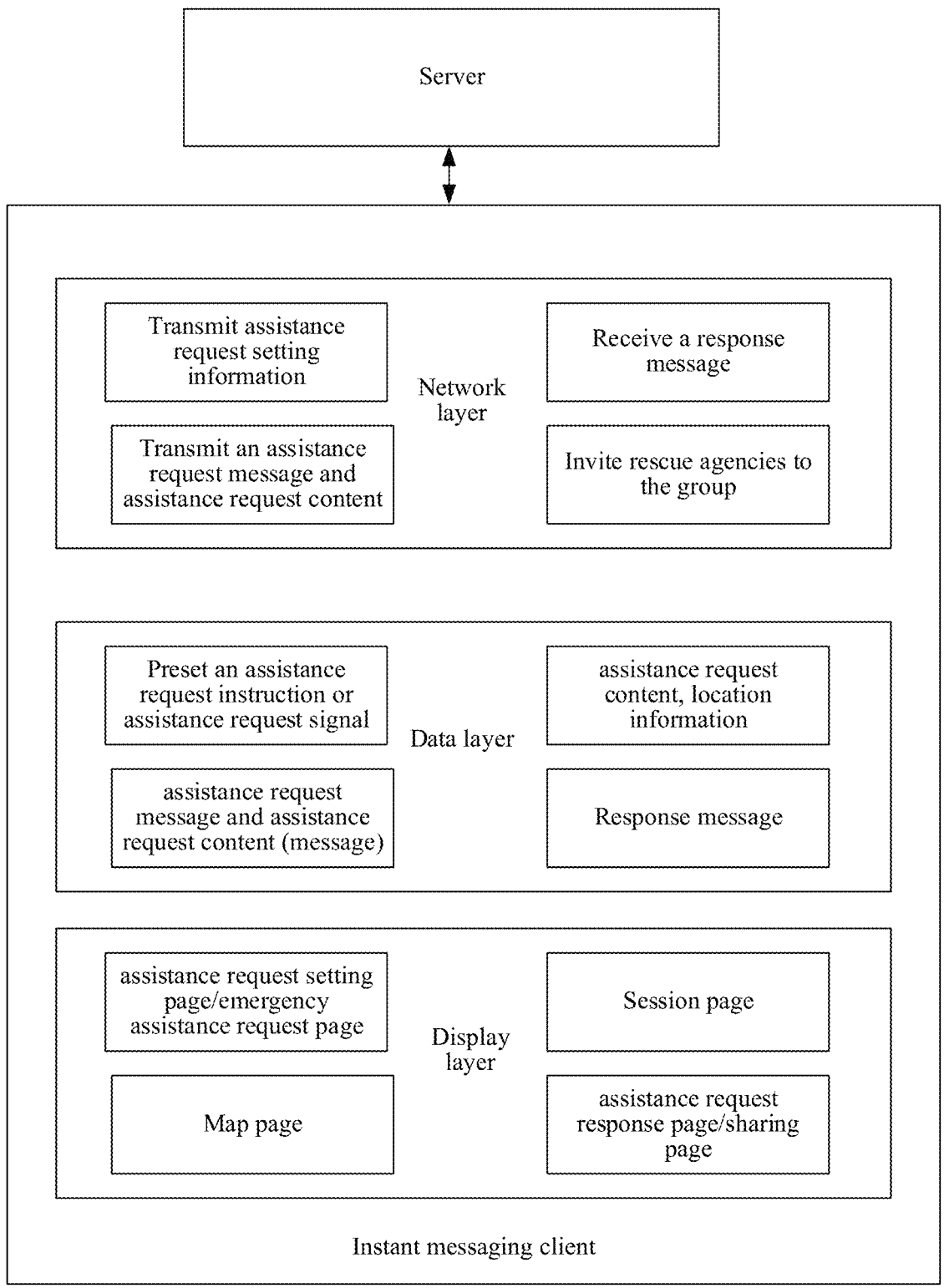
FIG. 6A is a schematic structural diagram of an instant messaging client according to an embodiment of this application.

A structure of an assistance request information interaction apparatus is involved. In this application, the instant messaging client may be used for initiating assistance request or responding to assistance request, but the functions applied when initiating assistance request and responding to assistance request are different. Referring to FIG. 6A, the instant messaging client (referred to as the client below) is mainly formed by three important modules, including a network layer, a data layer, and a display layer. The functions of each module are as follows:

1) Network layer: It is a module that communicates between the client and the backend server, configured to transmit an assistance request message or assistance request content to the server, and receive server pushes. After receiving data, the client updates the data to the data layer. The underlying communication protocol is udp. When the network cannot be connected, failure is prompted.

2) Data layer: This module mainly stores data related to the client, including an assistance request signal, assistance request content, location information of ann assistance requesting user and/or response information, and the like. The data is stored in a cache memory and a local database. When there is no data in the memory, the corresponding data is loaded in the database and cached in the memory, to improve the acquisition speed. When the server data is received, the client updates the memory and the database simultaneously.

3) Display layer: The client is responsible for the UI display part, which mainly includes three parts. The first part is an assistance request setting page and an emergency assistance request page, including an assistance request signal setting control, a request-receiving user setting control, an assistance request permission setting control, a voice input control, and the like, which are displayed by standard system controls. The second part is a session page, including assistance request content, an alarm button, a location information map, an assistance request message, a response message, and the like, which are displayed by standard system controls. The third part is a map page and a sharing page, which are mainly responsible for displaying location information of an assistance requesting user and a request-receiving user, sharing a selected object, and the like. The sharing page displays a sharing button and a sharing option (an instant messaging application or a third-party application). If sharing is for other users in the instant messaging application, the client transmits the location information of the assistance requesting user and the assistance request content to other user accounts. If sharing is for the third-party application, a page link returned by the server is used to generate a two-dimensional code image, and the two-dimensional code image is shared to the third-party application (WeChat, Weibo, or the like) through the standard sharing SDK.

The display layer is also responsible for responding to user interaction operations, monitoring click and drag events, and calling back to corresponding functions for processing, which is supported by standard system controls.

Figure 6B:
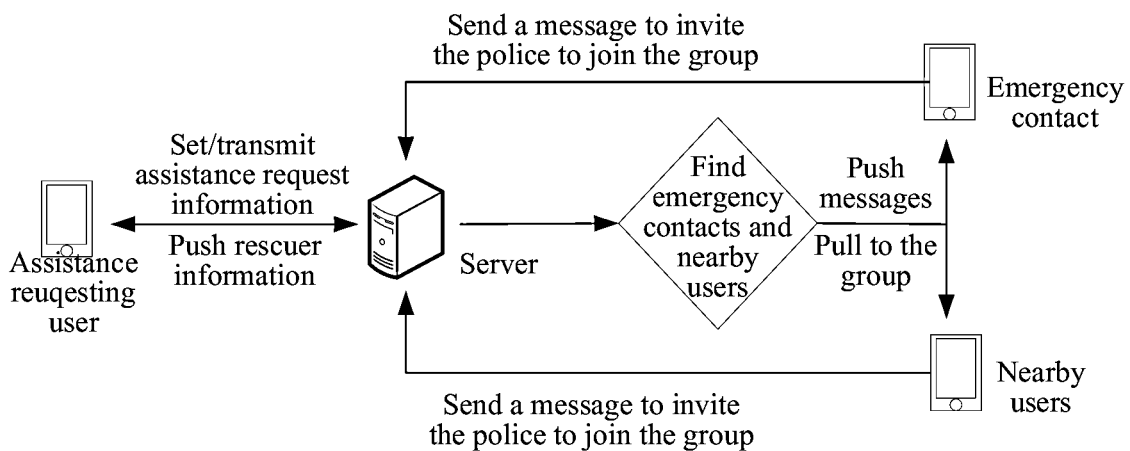
FIG. 6B is a schematic diagram of a scenario of assistance request information interaction according to an embodiment of this application.

FIG. 6B is a flowchart of communication between a server and a terminal in this embodiment. In this embodiment, the main functions of the server are as follows:

1) Receive information set by an assistance requesting user, transmit messages, and store assistance request data in a server cache and a database.

2) After receiving an assistance request message, the server searches the server cache for an emergency contact B of a user A, and a user C (if exists) within a current location range (10,000 m), and packages and pushes assistance request data (an account of the assistance requesting user, assistance request content, and the like) to a client thereof.

3) Once a request-receiving user responds to the assistance request message, the server pulls the request-receiving user and the assistance requesting user into a temporary session group (target group), and pushes a notification to update temporary session data to the assistance requesting user.

4) When a group member transmits information in the temporary session or invites the police to join the group, the client transmits the data to the server, and the server pushes the data to other users in the session to update the data.

Figure 2C:
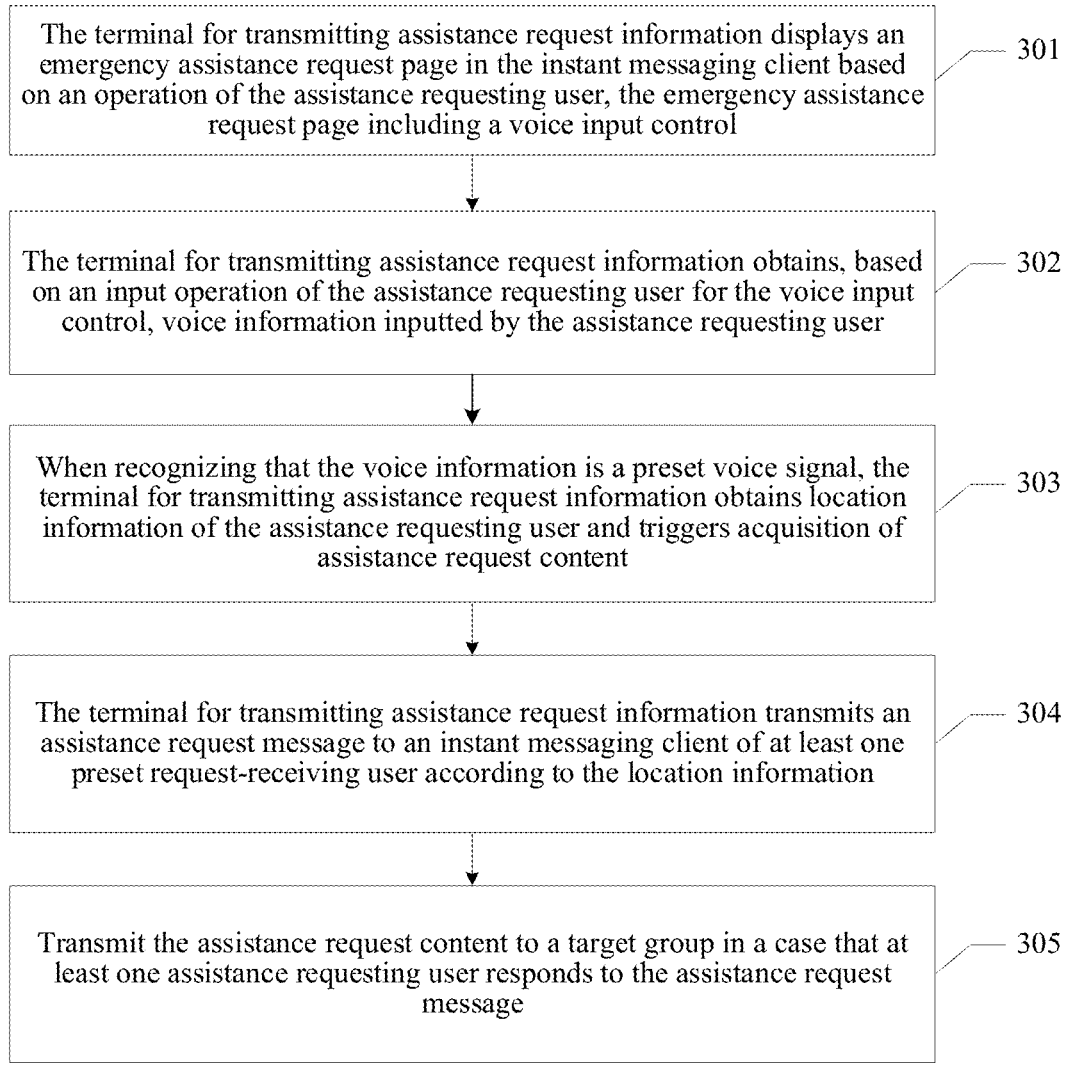
FIG. 2C is another flowchart of a method for transmitting assistance request information according to an embodiment of this application.

Referring to FIG. 2C, a description is made from the perspective of a terminal for transmitting assistance request information. The process of transmitting assistance request information is as follows:

The terminal for transmitting assistance request information displays an emergency assistance request page in the instant messaging client based on an operation of the assistance requesting user, the emergency assistance request page including a voice input control.

Referring to FIG. 5C and FIG. 5E, when it is detected that the assistance requesting user performs a pull-down operation on a user operation page of the instant messaging client, an emergency assistance request page is displayed, where a voice input control for inputting voice is displayed on the emergency assistance request page.

302: The terminal for transmitting assistance request information obtains, based on an input operation of the assistance requesting user for the voice input control, voice information inputted by the assistance requesting user.

Referring to FIG. 5C and FIG. 5E, the voice input control may be represented as a microphone icon, and the assistance requesting user may input voice information by touching and holding the icon.

303: When recognizing that the voice information is a preset voice signal, the terminal for transmitting assistance request information obtains location information of the assistance requesting user and triggers acquisition of assistance request content.

The voice signal is preset by the assistance requesting user, and is a signal for triggering an assistance request instruction.

The assistance requesting user may further preset assistance request permission, and determine an emergency contact from associated users of the assistance requesting user.

Referring to FIG. 5A, the assistance requesting user may set a voice signal and an associated rescue user on an assistance request setting page, as well as set assistance request permission, such as whether to allow asking for help from nearby non-associated users, or whether to transmit an assistance request message directly to a local rescue agency.

The assistance request permission setting control may be represented as a sliding button. To facilitate the assistance requesting user to understand the function of the button, prompt information may be displayed near the button, for example, "When asking for help from the emergency contact, assistance request is initiated from the person nearby, and the person involved in the rescue can communicate with your emergency contact about the rescue measures".

When it is recognized that the voice information is a preset voice signal, an audio recording function or video recording and photographing functions of the terminal may be further enabled, to acquire information about the environment where the assistance requesting user is located in real time and continuously.

When the audio recording function is enabled, voice information of the assistance requesting user may be recorded as assistance request content.

In addition, a positioning function of the terminal may be further enabled to track the location of the assistance requesting user in real time.

The assistance request content acquired by the terminal and the real-time location information of the user may be transmitted to the server in real time, and cached and forwarded by the server.

304: The terminal for transmitting assistance request information transmits an assistance request message to an instant messaging client of at least one preset request-receiving user according to the location information.

The server may receive assistance request data transmitted by the terminal, where the assistance request data may include the location information and the account of the assistance requesting user.

The server may determine the emergency contact and the assistance request permission set by the assistance requesting user according to the account of the assistance requesting user.

When the assistance request permission is that asking for help from a non-associated user is not allowed, the server generates an assistance request message according to the location information, uses the emergency contact set by the assistance requesting user as a request-receiving user, and transmits the assistance request message to an instant messaging client of the request-receiving user.

When the assistance request permission is that asking for help from a non-associated user is allowed, the server searches for non-associated users within a preset distance threshold according to the location information. If there are non-associated users (which may be referred to as nearby people) that meet the distance requirement, the nearby people and the emergency contact are used as request-receiving users, and the assistance request message is transmitted to instant messaging clients of the request-receiving users.

When the assistance request permission is that directly asking help from a local rescue agency is allowed, the server may also use the local rescue agency as a request-receiving user, and transmit the assistance request message to an instant messaging client of the local rescue agency.

305: Transmit the assistance request content to a target group when at least one request-receiving user responds to the assistance request message,
members of the target group including the assistance requesting user and at least one request-receiving user that responds to the assistance request message.

When the request-receiving user responds to the assistance request message, the server pulls the request-receiving user into the target group, generates a message according to the assistance request content, and transmits the assistance request content to the target group.

The assistance request content may include information such as voice, video, audio, and photos that are continuously acquired by the transmission terminal.

The server may further transmit the location information of the assistance requesting user to the target group. Referring to FIG. 5D, to facilitate the understanding of the location of the assistance requesting user, a map may be displayed in the target group, and a real-time location mark of the assistance requesting user may be displayed on the map.

Figure 2D:
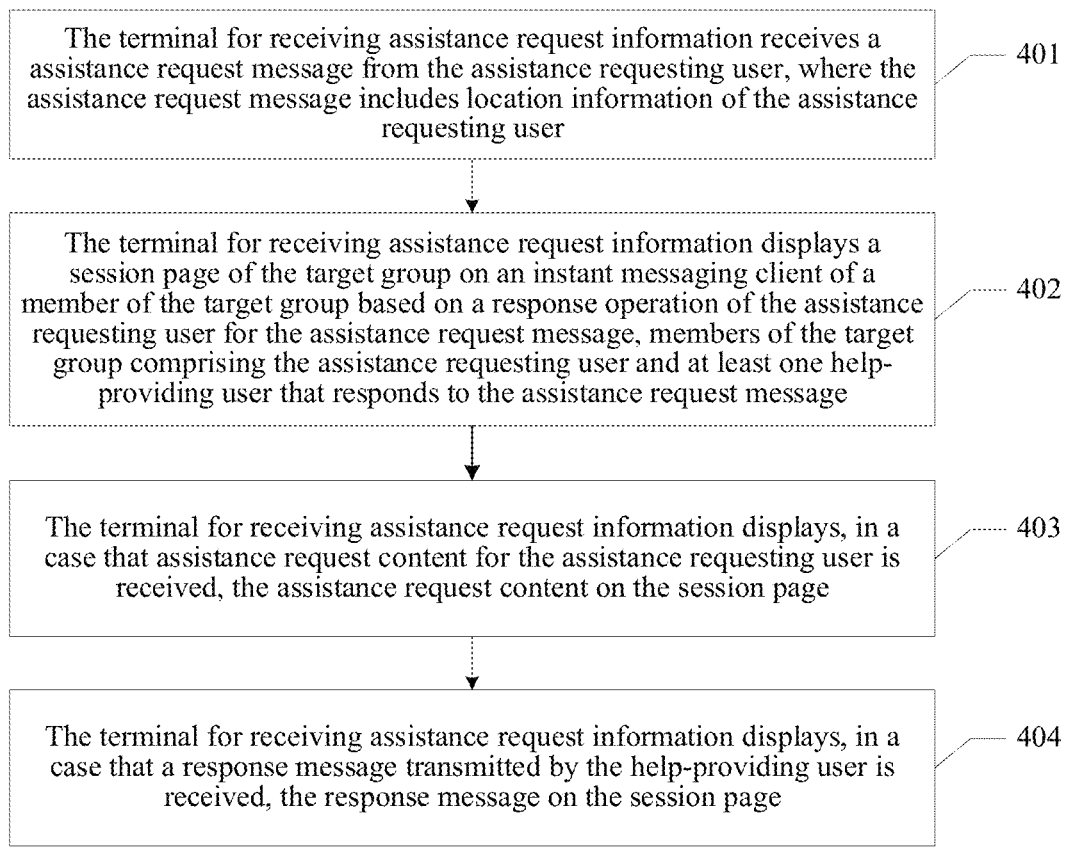
FIG. 2D is another flowchart of a method for responding to assistance request information according to an embodiment of this application.

Referring to FIG. 2D, a description is made from the perspective of a terminal for receiving assistance request information. The process of responding to assistance request information is as follows:
The terminal for receiving assistance request information receives an assistance request message from the assistance requesting user, where the assistance request message includes location information of the assistance requesting user.

The location information may be location information when the assistance requesting user initiates assistance request, or may be real-time location information of the assistance requesting user. Movement path information of the assistance requesting user is further generated according to a movement process of the assistance requesting user.

The location information may be displayed in the form of text or in the form of a map.

In an embodiment, referring to FIG. 5C, when the request-receiving user is an emergency contact, text content in the assistance request message is displayed in the instant messaging client, and when the text content is clicked, a session page is displayed. The session page includes a complete assistance request message, for example, a combined message of text and a map shown in ② in FIG. 5C and ③ in FIG. 5F.

In an embodiment, referring to FIG. 5F, when the request-receiving user is a non-associated user, the text content of the assistance request message is displayed in the form of a system message in the instant messaging client. When the request-receiving user clicks the text content, a map and a response control are displayed. Referring to ② in FIG. 5F, the map displays real-time location marks of the assistance requesting user and the request-receiving user. The request-receiving user may determine whether to join the rescue according to the map. If the request-receiving user agrees to join the rescue, the response control is clicked to enter the session page.

The terminal for receiving assistance request information displays a session page of the target group on an instant messaging client of a member of the target group based on a response operation of the assistance requesting user for the assistance request message, members of the target group including the assistance requesting user and at least one request-receiving user that responds to the assistance request message.

In this embodiment, the server may determine the members of the target group according to the relationship between the assistance requesting user and the request-receiving user, and the response operation of the request-receiving user. In some embodiments, if the request-receiving user is an emergency contact, the emergency contact is added to the target group. If the request-receiving user is a non-associated user, the server adds the request-receiving user to the target group only when the terminal detects that the request-receiving user clicks the response control, and transmits session data of the target group to the terminal to display the session page.

Based on this, the click operation of the assistance requesting user for the text content of the assistance request message is only to trigger the page update, and the operation for the response control is used to agree to join the rescue.

The terminal for receiving assistance request information displays, when assistance request content for the assistance requesting user is received, the assistance request content on the session page.

The server may continuously transmit the received assistance request content to the session page.

The assistance request content may include information such as voice, video, audio, and photos that are continuously acquired by the transmission terminal.

In this embodiment, the assistance request content is voice information of the assistance requesting user. The server may recognize the voice information and extract an assistance request keyword in the voice information. The server also transmits the corresponding assistance request keyword when transmitting the voice information.

The voice information and the assistance request keyword are displayed on the session page.

In an embodiment, the session page may further display the real-time location information of the assistance requesting user. Referring to FIG. 5D, a rescue map may be suspended on the session page. The rescue map may display the real-time location mark of the assistance requesting user and real-time location information of the group members.

The terminal for receiving assistance request information displays, when a response message transmitted by the request-receiving user is received, the response message on the session page.

The request-receiving user may transmit the response message in the group session, thereby achieving rapid communication and effective cooperation, jointly implementing rescues, and improving the rescue effect.

In this embodiment of this application, the session page includes an assistance request content display region and a response message display region. The assistance request content transmitted by the assistance requesting user is displayed in the assistance request content display region; and the response message transmitted by the request-receiving user is displayed in the response message display region. Accordingly, it can be ensured that the request-receiving user can directly view the assistance request content.

Referring to ② in FIG. 5C, the session page may further include an alarm control, and any member of the target group may click the alarm control to initiate an alarm call.

Referring to ④ in FIG. 5C, after an alarm call is initiated, a rescue agency adding control is displayed on the session page, and any member of the target group may click the control to add a local rescue agency to the target group.

Referring to ⑤ in FIG. 5C, after the local police is invited to join the target group, an alarm time may be automatically generated, and the name of the group may be updated to the alarm time.

Referring to ②, ④, and ⑤ in FIG. 5C, the session page may further include a user adding control, any member of the target group may click the control to add an associated user to the session of the target group, thereby expanding the rescue team.

Referring to FIG. 5G, the session page may further include a sharing control, and any member of the target group may click the control to trigger sharing of the location information of the assistance requesting user and the assistance request content.

A movement route on the map may be generated according to a location change from the time when the assistance requesting user initiates the assistance request to the current time, and the map marked with the movement route may be shared as the location information of the assistance requesting user. Corresponding time may be further marked at several key positions in the movement route.

Referring to FIG. 5G, when the sharing control is clicked, to-be-shared information is generated according to the location information of the assistance requesting user and the assistance request content. The to-be-shared information may further include a two-dimensional code. Referring to ② in FIG. 5G, a sharing preview page may be further displayed, where the sharing preview page includes the to-be-shared information, and further includes confirmation sharing controls corresponding to different applications. Clicking different confirmation sharing controls may share the to-be-shared information to different applications.

Figure 5H:
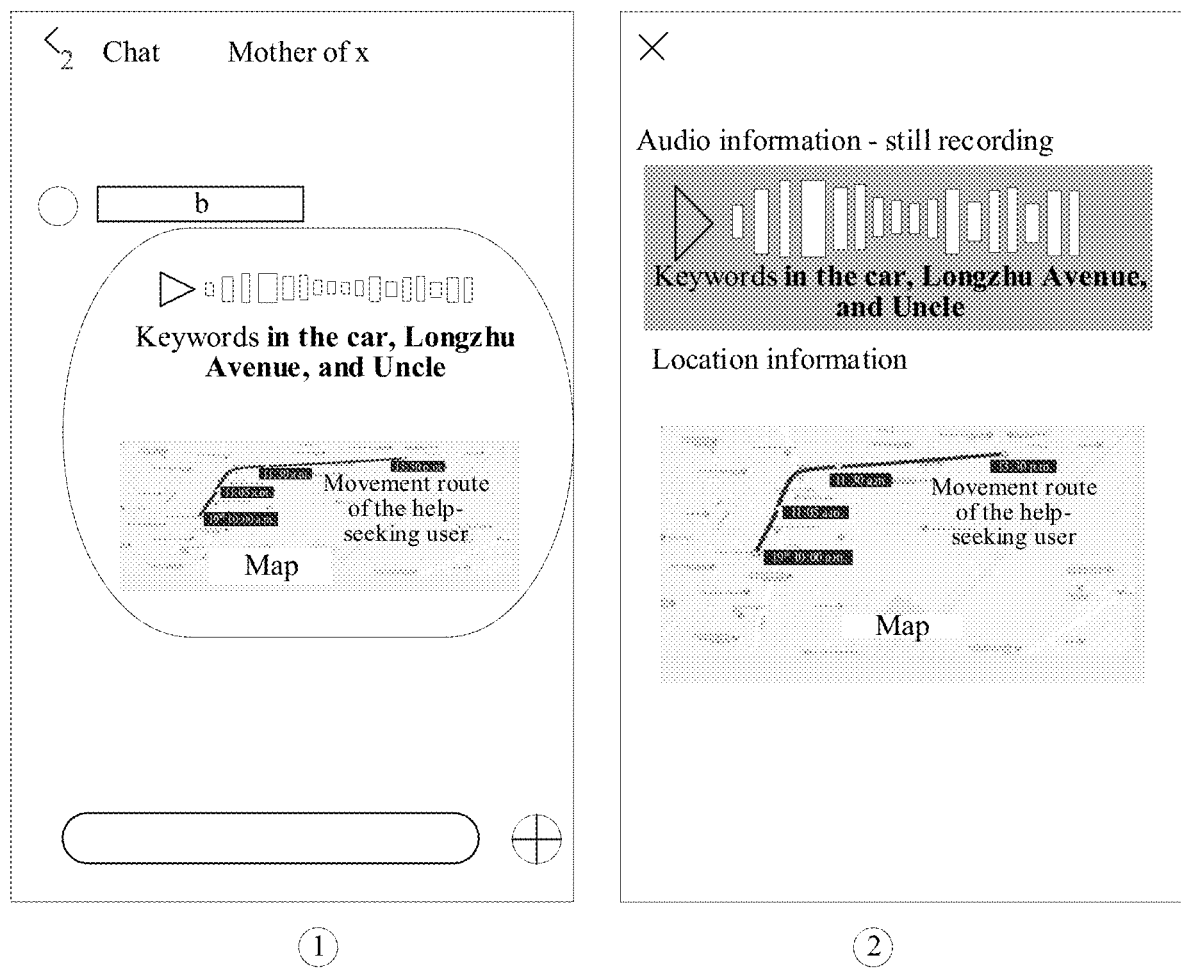
FIG. 5H is a schematic diagram of a page of viewing to-be-shared information according to an embodiment of this application.

When sharing is for different applications, the to-be-shared information has different expression forms. For example, referring to the first picture in FIG. 5H, when sharing is for the same instant messaging application, the location information and the assistance request content of the assistance requesting user may be directly displayed on the page. When sharing is for other applications, the location information and the assistance request content of the assistance requesting user may be obtained by scanning the two-dimensional code, and the second picture of FIG. 5H is displayed. In some embodiments, the location information of the assistance requesting user and the location where the assistance request content is stored in the server may be shared, so that the location information and the assistance request content transmitted by the assistance requesting user after updating the sharing time may also be received by a sharing object.

To better implement the method for transmitting assistance request information provided in the embodiments of the present disclosure, an embodiment of this application further provides an apparatus for transmitting assistance request information. The apparatus for transmitting assistance request information may be configured on a terminal for transmitting assistance request information. Nouns have meanings the same as those in the foregoing method for transmitting assistance request information. For implementation details, refer to the description in the method embodiments.

Figure 3A:
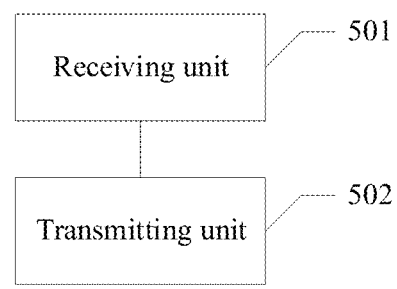
FIG. 3A is a schematic structural diagram of an apparatus for transmitting assistance request information according to an embodiment of this application.
Figure 3B:
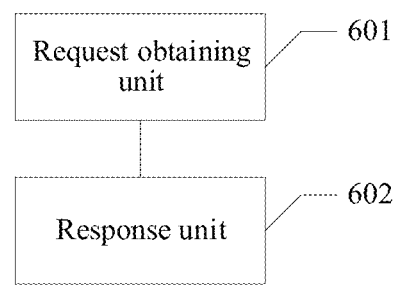
FIG. 3B is a schematic structural diagram of an apparatus for receiving assistance request information according to an embodiment of this application.
Figure 3C:
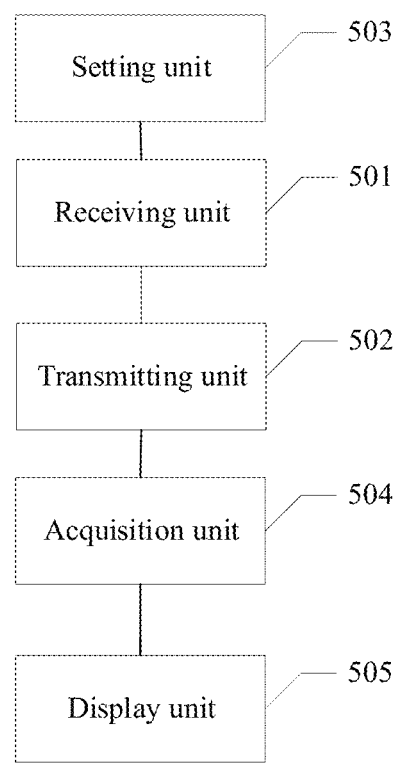
FIG. 3C is another schematic structural diagram of an apparatus for transmitting assistance request information according to an embodiment of this application.

In an embodiment, an apparatus for transmitting assistance request information is further provided. The apparatus for transmitting assistance request information may be integrated in a terminal such as the terminal for transmitting assistance request information. As shown in FIG. 3A and FIG. 3C, the apparatus for transmitting assistance request information may include a receiving unit 501 and a transmitting unit 502.

The receiving unit 501 is configured to receive an assistance request instruction.

In an embodiment, the receiving unit 501 is further configured to:
 display an emergency assistance request page on an instant messaging client of the assistance requesting user;
 obtain assistance request verification information inputted by the assistance requesting user based on an information input operation of the assistance requesting user on the emergency assistance request page; and
 trigger the reception of the assistance request instruction when verification of the assistance request verification information succeeds.

In some embodiments, before the receiving unit 501, a setting unit 503 is further included, configured to:
 display an assistance request setting page according to an assistance request setting instruction triggered by the assistance requesting user on the instant messaging client, the assistance request setting page including an assistance request signal setting control, a request-receiving user setting control, and an assistance request permission setting control;
 determine, based on a setting operation of the assistance requesting user for the assistance request signal setting control, an assistance request signal for triggering assistance request;
 determine, from associated users of the assistance requesting user in an instant messaging system, an associated rescue user for transmitting the assistance request message based on a setting operation of the assistance requesting user for the request-receiving user setting control; and
 determine assistance request permission based on a setting operation of the assistance requesting user for the assistance request permission setting control.

The transmitting unit 502 is configured to transmit an assistance request message to an instant messaging client of at least one request-receiving user based on the assistance request instruction.

In an embodiment, the transmitting unit 502 is further configured to:
 transmit the assistance request message to an instant messaging client of an associated rescue user when the assistance request permission is that asking for help from a non-associated user is not allowed, the associated rescue user being a request-receiving user associated with the assistance requesting user in an instant messaging system;
 obtain a user of the instant messaging system within a preset assistance request distance threshold as a non-associated rescue user when the assistance request permission is that asking for help from a non-associated user is allowed; and
 transmit the assistance request message to the instant messaging client of the associated rescue user and an instant messaging client of the non-associated rescue user.

In some embodiments, the apparatus for transmitting assistance request information may further include an acquisition unit 504. The acquisition unit 504 is configured to:
 trigger, based on the assistance request instruction, acquisition of assistance request content; and
 transmit the assistance request content to an instant messaging client of at least one request-receiving user.

In some embodiments, the acquisition unit 504 is further configured to:
 trigger the transmission of the assistance request content to instant messaging clients of members in a target group when an instant messaging client of at least one request-receiving user responds to the assistance request message, the members of the target group including the assistance requesting user and at least one request-receiving user that responds to the assistance request message.

In some embodiments, after the transmitting unit 502, a display unit 505 is further included, configured to:
 display a rescue map, the rescue map including at least a real-time location mark of the assistance requesting user or a real-time location mark of the request-receiving user.

Figure 3D:
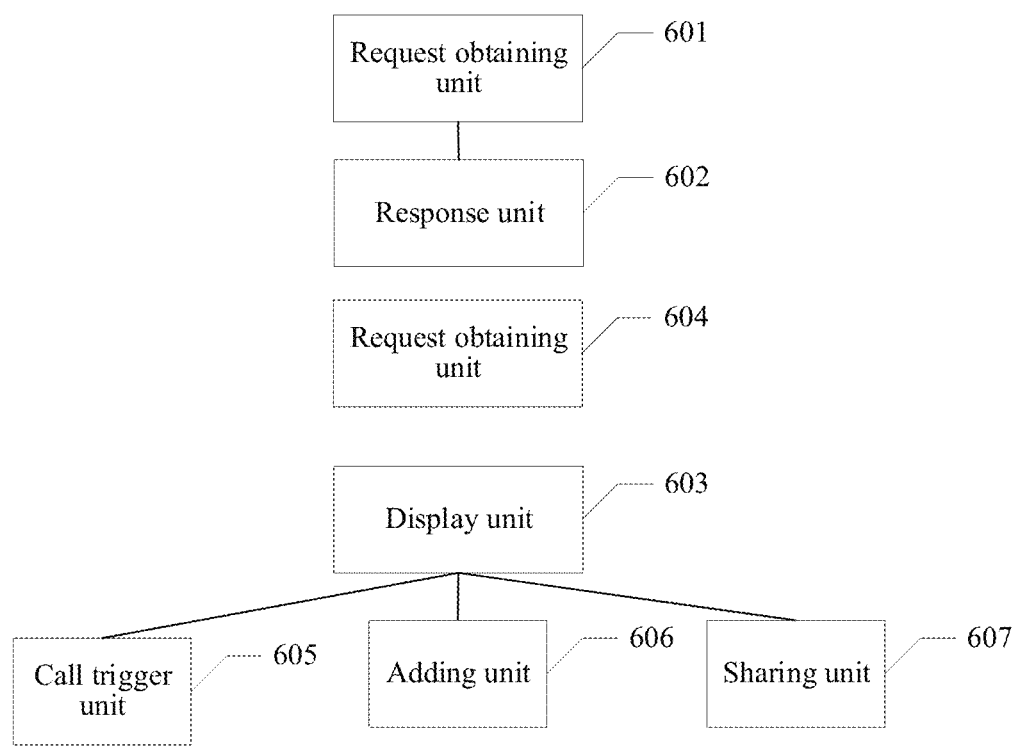
FIG. 3D is another schematic structural diagram of an apparatus for receiving assistance request information according to an embodiment of this application.

In an embodiment, an apparatus for receiving assistance request information is further provided. The apparatus for receiving assistance request information may be integrated in a terminal such as the terminal for transmitting assistance request information. As shown in FIG. 3B and FIG. 3D, the apparatus for receiving assistance request information may include a request obtaining unit 601 and a response unit 602.

The request obtaining unit 601 is configured to receive an assistance request message from an assistance requesting user.

The response unit 602 is configured to display the assistance request message on a user operation page of an instant messaging client.

In some embodiments, the apparatus for receiving assistance request information further includes a display unit 603, configured to:
 display a session page in response to an operation of a request-receiving user for the assistance request message, the session page including the assistance request message;
 or,
 display a session page of a target group on an instant messaging client in response to the operation of the request-receiving user for the assistance request message, members of the target group including the assistance requesting user and at least one request-receiving user that responds to the assistance request message, and the session page of the target group including the assistance request message.

In an embodiment, the display unit 603 is further configured to:

display an assistance request response page in response to the operation of the request-receiving user for the assistance request message, the assistance request response page including location information of the assistance requesting user and a response control; and display the session page in response to a trigger operation of the request-receiving user for the response control.

In some embodiments, the apparatus for receiving assistance request information further includes a content obtaining unit 604, configured to:

display, when assistance request content transmitted by the assistance requesting user is received, the assistance request content on the session page.

In an embodiment, the session page includes an assistance request content display region and a response message display region, and the display unit 603 is further configured to:

display the assistance request content transmitted by the assistance requesting user in the assistance request content display region; and display, when a response message transmitted by the request-receiving user is received, the response message transmitted by the request-receiving user in the response message display region.

In an embodiment, the display unit 603 is further configured to:

suspend a rescue map on the session page, the rescue map including a real-time location mark of the assistance requesting user and a real-time location mark of the request-receiving user.

In some embodiments, the session page includes an alarm control, and the apparatus for receiving assistance request information further includes a call trigger unit 605, configured to:

initiate an alarm call when a trigger operation of the request-receiving user for the alarm control is detected.

In some embodiments, the session page may further include a rescue agency adding control and a user adding control, and the apparatus for receiving assistance request information further includes an adding unit 606, configured to:

trigger obtaining of, based on a trigger operation of a member of the target group for the rescue agency adding control according to the location information of the assistance requesting user, an account of a local rescue agency in an instant messaging system and adding of the account to the target group; and display, when a response message transmitted by the rescue agency is received, the response message transmitted by the rescue agency on the session page of the target group;

or, display a session user selection list when a trigger operation of a member of the target group for the user adding control is detected, a session user being an associated user of the rescue user in the instant messaging system; and trigger addition of a session user selected by the rescue user to the target group based on a selection operation of the rescue user in the session user selection list.

In some embodiments, the session page may further include a sharing control, and the apparatus for receiving assistance request information further includes a sharing unit 607, configured to:

trigger sharing of the assistance request message and the assistance request content when a trigger operation of the request-receiving user for the sharing control is detected.

During some embodiments, the foregoing units may be implemented as independent entities, or may be combined arbitrarily, or may be implemented as the same entity or several entities. For specific implementation of the foregoing units, refer to the foregoing method embodiments. Details are not described herein again.

As can be learned from above, in the embodiments of the present disclosure, the assistance request message is transmitted through the instant messaging client. Based on the popularization of the instant messaging client and the advantages of communication forms, the interaction of assistance request information is more convenient, and the request-receiving user can better understand the situation of the assistance requesting user, thereby improving the rescue effect.

Figure 4:
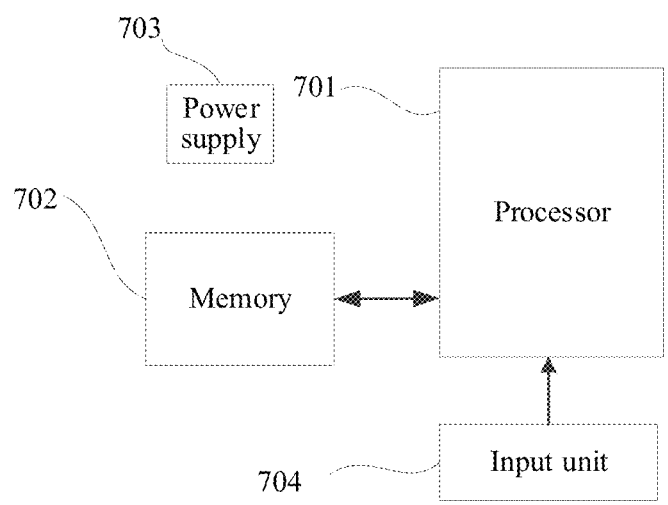
FIG. 4 is a schematic structural diagram of a network device according to an embodiment of this application.

An embodiment of the present disclosure further provides a network device, which may include a terminal or a server, for example, the network device may be used as a terminal for transmitting assistance request information, or a terminal for receiving assistance request information. The terminal may be a mobile phone, a tablet computer, or the like. In another example, the network device may be a server, for example, a server in an instant messaging system. FIG. 4 is a schematic structural diagram of a network device according to an embodiment of the present disclosure. Specifically, the network device may include components such as a processor 701 including one or more processing cores, a memory 702 including one or more computer-readable storage media, a power supply 703, and an input unit 704. A person skilled in the art may understand that the structure of the network device shown in FIG. 4 does not constitute a limitation to the network device, and the network device may include more or fewer components than those shown in the figure, or some components may be combined, or a different component deployment may be used.

The processor 701 is the control center of the network device, connects all parts of the entire network device by using various interfaces and lines, and executes various functions and processing data of the network device by running or executing software programs and/or modules stored in the memory 702, and calling data stored in the memory 702, thereby performing overall monitoring on the network device. In some embodiments, the processor 701 may include one or more processing cores. Preferably, the processor 701 may integrate an application processor and a modem processor. The application processor mainly processes an operating system, a user page, an application, and the like. The modem processor mainly processes wireless communication. It may be understood that the foregoing modem processor may alternatively not be integrated into the processor 701.

The memory 702 may be configured to store a software program and a module, and the processor 701 runs the software program and the module that are stored in the memory 702, to implement various functional applications and data processing. The memory 702 may mainly include a program storage area and a data storage area. The program storage area may store an operating system, an application required by at least one function (for example, a sound playback function and an image playback function), or the like. The data storage area may store data created according to use of the network device. In addition, the memory 702 may include a high speed random access memory, and may also include a non-volatile memory, such as at least one magnetic disk storage device, a flash memory, or another volatile solid-state storage device. Correspondingly, the memory 702 may further include a memory controller, so that the processor 701 may access the memory 702.

The network device further includes the power supply 703 for supplying power to the components. Preferably, the power supply 703 may be logically connected to the processor 701 by using a power management system, thereby implementing functions such as charging, discharging, and power consumption management by using the power management system. The power supply 703 may further include one or more direct current or alternating current power supplies, a re-charging system, a power failure detection circuit, a power supply converter or inverter, a power supply state indicator, and any other component.

The network device may further include the input unit 704. The input unit 704 may be configured to receive input digit or character information and generate keyboard, mouse, joystick, optical, or trackball signal input related to user settings and function control.

Although not shown in the figure, the network device may further include a display unit, and the like. Details are not described herein again. In this embodiment, the processor 701 in the network device may load executable files corresponding to processes of one or more applications to the memory 702 according to the following instructions, and the processor 701 runs an application stored in the memory 702, to implement various functions as follows:

receiving an assistance request instruction; and
transmitting an assistance request message to an instant messaging client of at least one request-receiving user based on the assistance request instruction;
or
receiving an assistance request message from an assistance requesting user; and
displaying the assistance request message on a user operation page of an instant messaging client.

As can be learned from above, the terminals provided in the embodiments of the present disclosure can implement the assistance request information interaction between two terminals.

A person of ordinary skill in the art may understand that all or some steps of the methods in the foregoing embodiments may be implemented by using instructions, or implemented through instructions controlling relevant hardware, and the instructions may be stored in a computer-readable storage medium and loaded and executed by a processor.

Therefore, an embodiment of the present disclosure provides a storage medium, storing a plurality of instructions, the instructions being capable of being loaded by a processor, to perform steps in any of the method for transmitting assistance request information or the method for responding to assistance request information according to the embodiments of the present disclosure.

The previous embodiments may be referred to for the implementation of each of the foregoing operations. Details are not further described herein.

The storage medium may include a read-only memory (ROM), a random access memory (RAM), a magnetic disk, an optical disc, or the like.

Because the instructions stored in the storage medium may perform the steps in any of the method for transmitting assistance request information or the method for responding to assistance request information according to the embodiments of the present disclosure, the instructions can implement beneficial effects that may be implemented by any of the method for transmitting assistance request information or the method for responding to assistance request information according to the embodiments of the present disclosure. For details, refer to the foregoing embodiments. Details are not described herein again.

The principle and implementations of the present disclosure is described herein through specific examples. The description about the embodiments of the present disclosure is merely provided to help understand the method and core ideas of the present disclosure. Meanwhile, a person skilled in the art may make modifications in terms of the specific implementations and application scopes according to the idea of the present disclosure. The content of this specification should not be construed as a limit to the present disclosure.

What is claimed is:

1. A method for transmitting assistance request information, implemented by a terminal, the method comprising:
    displaying, by an instant messaging (IM) client of a requesting user executed on the terminal, an assistance request setting page, the assistance request setting page comprising a first control for customizing an assistance request signal and a second control for selecting an IM user account associated with the requesting user as an emergency contact, the assistance request signal including at least one of a piece of voice about a specific phrase, a text, a fingerprint, a connection pattern, or an operation gesture;
    in response to the instant messaging client of the requesting user receiving an assistance request verification signal that matches the customized assistance request signal, determining that an assistance request instruction is received;
    transmitting an assistance request message to an instant messaging client of at least one request-receiving user based on the assistance request instruction, the assistance request message being displayed on a session page of the instant messaging client, the session page being used by the at least one request-receiving user to conduct a message session; and
    acquiring assistance request content of an assistance requesting user in real time, and displaying the assistance request content to the session page.

2. The method for transmitting assistance request information according to claim 1, wherein the acquiring assistance request content of an assistance requesting user in real time comprises:
    enabling an audio recording function to acquire in real time audio information of a scene where the assistance requesting user is located, and using the acquired audio information as the assistance request content.

3. The method for transmitting assistance request information according to claim 1, wherein the displaying the assistance request content to the session page comprises:
    transmitting the assistance request content to instant messaging clients of members in a target group when an instant messaging client of at least one request-receiving user responds to the assistance request message, to display the assistance request content through the session page, the members of the target group comprising the assistance requesting user and at least one request-receiving user that responds to the assistance request message.

4. The method for transmitting assistance request information according to claim 1, wherein the receiving an assistance request instruction comprises:
  in response to receiving a trigger signal while displaying an operation page of the instant messaging client of the requesting user, displaying an emergency assistance request page on an instant messaging client of the assistance requesting user;
  obtaining assistance request verification information inputted by the assistance requesting user based on an information input operation of the assistance requesting user on the emergency assistance request page, the assistance request verification information including the assistance request verification signal; and
  receiving the assistance request instruction when verification of the assistance request verification information succeeds.

5. The method for transmitting assistance request information according to claim 4, wherein before the displaying an emergency assistance request page on an instant messaging client of the assistance requesting user, the method further comprises:
  displaying an assistance request setting page according to an assistance request setting instruction triggered by the assistance requesting user on the instant messaging client, the assistance request setting page comprising an assistance request signal setting control and a request-receiving user setting control;
  determining, based on a setting operation of the assistance requesting user for the assistance request signal setting control, an assistance request signal for triggering assistance request, the assistance request signal being used for verifying the assistance request verification information; and
  determining, from associated users of the assistance requesting user in an instant messaging system, an associated rescue user for transmitting the assistance request message as the request-receiving user based on a setting operation of the assistance requesting user for the request-receiving user setting control.

6. The method for transmitting assistance request information according to claim 4, wherein the assistance request setting page further comprises an assistance request permission setting control, and before the displaying an emergency assistance request page on an instant messaging client of the assistance requesting user, the method further comprises:
  determining assistance request permission based on a setting operation of the assistance requesting user for the assistance request permission setting control; and
  correspondingly, the transmitting an assistance request message to an instant messaging client of at least one request-receiving user based on the assistance request instruction comprises:
  transmitting the assistance request message to an instant messaging client of an associated rescue user when the assistance request permission is that asking for help from a non-associated rescue user is not allowed, the associated rescue user being a request-receiving user associated with the assistance requesting user in an instant messaging system; and
  obtaining a user of the instant messaging system within a preset assistance request distance threshold as a non-associated rescue user when the assistance request permission is that asking for help from a non-associated rescue user is allowed, and transmitting the assistance request message to the instant messaging client of the associated rescue user and an instant messaging client of the non-associated rescue user.

7. The method according to claim 4, further comprising:
  displaying prompting information on the emergency assistance request page about an operation that needs to be performed for initiating the assistance request instruction.

8. The method for transmitting assistance request information according to claim 1, wherein after the transmitting an assistance request message to an instant messaging client of at least one request-receiving user based on the assistance request instruction, the method further comprises:
  displaying a rescue map, the rescue map comprising at least a real-time location mark of the assistance requesting user or a real-time location mark of the request-receiving user.

9. The method for transmitting assistance request information according to claim 1, wherein after the transmitting an assistance request message to an instant messaging client of at least one request-receiving user, the method further comprises:
  displaying a message transmission indication page, and displaying a transmission result of the assistance request message and voice acquisition indication information corresponding to the assistance request content on the indication page,
  the voice acquisition indication information indicating that audio acquisition is being performed in real time, and indicating that an audio acquisition result is synchronized to the session page.

10. The method for transmitting assistance request information according to claim 1, wherein after the transmitting an assistance request message to an instant messaging client of at least one request-receiving user, the method further comprises:
  displaying a session page, the session page being used for the assistance requesting user and the at least one request-receiving user to conduct a message session; and
  displaying the assistance request message by using a map thumbnail on the session page,
  location information corresponding to the assistance requesting user being marked in the map thumbnail.

11. The method according to claim 1, wherein:
  the assistance request setting page further comprises an assistance request permission setting control for setting an assistance request permission that allows or disallows transmitting the assistance request message to an IM user account not associated with the requesting user; and
  in response to the assistance request permission being allowed, the at least one request-receiving user comprises: the IM user account selected by the requesting user as the emergency contact, and an IM user account that is not associated with the requesting user and located within a distance range of the requesting user.

12. A non-transitory computer-readable storage medium, storing a computer program, the computer program being configured to cause a processor to perform:
  displaying, by an instant messaging (IM) client of a requesting user executed on the terminal, an assistance request setting page, the assistance request setting page comprising a first control for customizing an assistance request signal and a second control for selecting an IM user account associated with the requesting user as an emergency contact, the assistance request signal including at least one of a piece of voice about a specific phrase, a text, a fingerprint, a connection pattern, or an operation gesture;

in response to the instant messaging client of the requesting user receiving an assistance request verification signal that matches the customized assistance request signal, determining that an assistance request instruction is received;

transmitting an assistance request message to an instant messaging client of at least one request-receiving user based on the assistance request instruction, the assistance request message being displayed on a session page of the instant messaging client, the session page being used by the at least one request-receiving user to conduct a message session; and acquiring assistance request content of an assistance requesting user in real time, and displaying the assistance request content to the session page.

13. The computer-readable storage medium according to claim 12, wherein the acquiring assistance request content of an assistance requesting user in real time comprises:

enabling an audio recording function to acquire in real time audio information of a scene where the assistance requesting user is located, and using the acquired audio information as the assistance request content.

14. The computer-readable storage medium according to claim 12, wherein the simultaneously displaying the assistance request content to the session page comprises:

transmitting the assistance request content to instant messaging clients of members in a target group when an instant messaging client of at least one request-receiving user responds to the assistance request message, to display the assistance request content through the session page, the members of the target group comprising the assistance requesting user and at least one request-receiving user that responds to the assistance request message.

15. The computer-readable storage medium according to claim 12, wherein the receiving an assistance request instruction comprises:

displaying an emergency assistance request page on an instant messaging client of the assistance requesting user;

obtaining assistance request verification information inputted by the assistance requesting user based on an information input operation of the assistance requesting user on the emergency assistance request page; and receiving the assistance request instruction when verification of the assistance request verification information succeeds.

16. The computer-readable storage medium according to claim 15, wherein before the displaying an emergency assistance request page on an instant messaging client of the assistance requesting user, the computer program further causes the processor to perform:

displaying an assistance request setting page according to an assistance request setting instruction triggered by the assistance requesting user on the instant messaging client, the assistance request setting page comprising an assistance request signal setting control and a request-receiving user setting control;

determining, based on a setting operation of the assistance requesting user for the assistance request signal setting control, an assistance request signal for triggering assistance request, the assistance request signal being used for verifying the assistance request verification information; and determining, from associated users of the assistance requesting user in an instant messaging system, an associated rescue user for transmitting the assistance request message as the request-receiving user based on a setting operation of the assistance requesting user for the request-receiving user setting control.

17. The computer-readable storage medium according to claim 15, wherein the assistance request setting page further comprises an assistance request permission setting control, and before the displaying an emergency assistance request page on an instant messaging client of the assistance requesting user, the computer program further causes the processor to perform:

determining assistance request permission based on a setting operation of the assistance requesting user for the assistance request permission setting control; and correspondingly, the transmitting an assistance request message to an instant messaging client of at least one request-receiving user based on the assistance request instruction comprises:

transmitting the assistance request message to an instant messaging client of an associated rescue user when the assistance request permission is that asking for help from a non-associated rescue user is not allowed, the associated rescue user being a request-receiving user associated with the assistance requesting user in an instant messaging system; and obtaining a user of the instant messaging system within a preset assistance request distance threshold as a non-associated rescue user when the assistance request permission is that asking for help from a non-associated rescue user is allowed, and transmitting the assistance request message to the instant messaging client of the associated rescue user and an instant messaging client of the non-associated rescue user.

18. The computer-readable storage medium according to claim 12, wherein after the transmitting an assistance request message to an instant messaging client of at least one request-receiving user based on the assistance request instruction, the computer program further causes the processor to perform:

displaying a rescue map, the rescue map comprising at least a real-time location mark of the assistance requesting user or a real-time location mark of the request-receiving user.

19. The computer-readable storage medium according to claim 12, wherein after the transmitting an assistance request message to an instant messaging client of at least one request-receiving user, the computer program further causes the processor to perform:

displaying a message transmission indication page, and displaying a transmission result of the assistance request message and voice acquisition indication information corresponding to the assistance request content on the indication page, the voice acquisition indication information indicating that audio acquisition is being performed in real time, and indicating that an audio acquisition result is synchronized to the session page.

20. A terminal for transmitting assistance request information, comprising:

one or more processors; and a storage medium, configured to store one or more programs, the one or more programs, when executed by the one or more processors, cause the one or more processors to perform:

displaying, by an instant messaging (IM) client of a requesting user executed on the terminal, an assistance request setting page, the assistance request setting page comprising a first control for customizing an assistance request signal and a second control for selecting an IM user account associated with the requesting user as an emergency contact, the assistance request signal including at least one of a piece of voice about a specific phrase, a text, a fingerprint, a connection pattern, or an operation gesture;

in response to the instant messaging client of the requesting user receiving an assistance request verification signal that matches the customized assistance request signal, determining that an assistance request instruction is received;

transmitting an assistance request message to an instant messaging client of at least one request-receiving user based on the assistance request instruction, the assistance request message being displayed on a session page of the instant messaging client, the session page being used by the at least one request-receiving user to conduct a message session; and acquiring assistance request content of an assistance requesting user in real time, and displaying the assistance request content to the session page.

\* \* \* \* \*